(12) United States Patent
Vishnubhatta et al.

(10) Patent No.: US 8,972,421 B2
(45) Date of Patent: Mar. 3, 2015

(54) SYSTEMS AND METHODS FOR PROPAGATING A GLOBAL FILTER TO INDIVIDUAL DATASETS

(75) Inventors: Srinivas Vishnubhatta, San Francisco, CA (US); Guillaume Le Stum, San Francisco, CA (US); Wei Li, Foster City, CA (US)

(73) Assignee: salesforce.com, inc., San Francisco, CA (US)

( * ) Notice: Subject to any disclaimer, the term of this patent is extended or adjusted under 35 U.S.C. 154(b) by 237 days.

(21) Appl. No.: 13/557,027

(22) Filed: Jul. 24, 2012

(65) Prior Publication Data

US 2013/0103701 A1 Apr. 25, 2013

Related U.S. Application Data

(60) Provisional application No. 61/511,865, filed on Jul. 26, 2011.

(51) Int. Cl.
*G06F 17/30* (2006.01)

(52) U.S. Cl.
CPC ................ *G06F 17/30595* (2013.01)
USPC .......................................... 707/754; 707/771

(58) Field of Classification Search
USPC .................. 707/737, 754, 777, 778, 707, 771
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz |
| 5,649,104 A | 7/1997 | Carleton |
| 5,715,450 A | 2/1998 | Ambrose et al. |
| 5,761,419 A | 6/1998 | Schwartz |
| 5,819,038 A | 10/1998 | Carleton |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |

(Continued)

*Primary Examiner* — Marc Filipczyk
(74) *Attorney, Agent, or Firm* — Dergosits & Noah LLP; Todd A. Noah

(57) ABSTRACT

A user can define a filter to applied be to one or more datasets. The filter includes a specification of a field to filter. Upon applying the filter to a dataset, if the specified field cannot be found in the dataset, a field in the dataset is selected as a default field to filter. Selecting what field in the dataset should be the default field is based on evaluating a set of rules. The default field is then filtered according to the filter criteria.

8 Claims, 19 Drawing Sheets

(56) References Cited

U.S. PATENT DOCUMENTS

| | | |
|---|---|---|
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier |
| 6,654,032 B1 | 11/2003 | Zhu |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,340,411 B2 | 3/2008 | Cook |
| 7,401,094 B1 | 7/2008 | Kesler |
| 7,620,655 B2 | 11/2009 | Larsson |
| 7,698,160 B2 | 4/2010 | Beaven et al. |
| 7,792,821 B2 * | 9/2010 | Shakib et al. ............ 707/714 |
| 8,010,663 B2 * | 8/2011 | Firminger et al. ............ 709/224 |
| 8,082,301 B2 | 12/2011 | Ahlgren et al. |
| 8,095,413 B1 | 1/2012 | Beaven et al. |
| 8,095,594 B2 | 1/2012 | Beaven et al. |
| 8,275,836 B2 | 9/2012 | Beaven et al. |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2004/0001092 A1 | 1/2004 | Rothwein et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2009/0063415 A1 | 3/2009 | Chatfield et al. |

\* cited by examiner

Editing Filters on Viewer

Equivalent Fields on Components

Error States for Component Filters

SYSTEMS AND METHODS FOR PROPAGATING A GLOBAL FILTER TO INDIVIDUAL DATASETS

CLAIM OF PRIORITY

This application claims the benefit of U.S. Provisional Patent Application 61/511,865, entitled SYSTEMS AND METHODS FOR PROPAGATING A GLOBAL FILTER TO INDIVIDIUAL DATASETS, by Srinivas Vishnubhatta, Guillaume Le Stum, and Wei Li, filed Jul. 26, 2011, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

One or more implementations relate generally to computer systems and software, and, more particularly, to applying a filter to a dataset.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Good information allows for good decisions. Unfortunately, we take in so much information in so many different forms every day, it is hard to make sense of it all. The amount of data available to be analyzed continues to grow as more and more human activity moves on-line. As more and more information is collected from more and more places, making sense of that information in a unified way becomes increasingly difficult.

For example, a salesperson may have hundreds of contacts and interactions to track and manage, new deals to pursue and close, and existing customer relationships to cultivate and maintain. Customers are demanding more and better service, delivered through every conceivable channel.

Large strides have been made in processing power and storage to enable the collection and storage of information. But, without tools to make sense of that data and use it selectively to answer key questions, the data is useless.

Therefore, there is a need for improved systems and techniques for managing information.

BRIEF SUMMARY

In an embodiment, a user can define a filter to applied be to one or more datasets. The filter includes a specification of a field to filter. Upon applying the filter to a dataset, if the specified field cannot be found in the dataset, a field in the dataset is selected as a default field to filter. Selecting what field in the dataset should be the default field is based on evaluating a set of rules. The default field is then filtered according to the filter criteria.

In an embodiment and by way of example, a method for propagating a global filter to individual datasets includes providing a dashboard component that summarizes a set of records, each record having a plurality of fields, receiving a filter specifying a field, and a filter option, and applying the filter to the dashboard component by examining the fields of the set of records to identify a field that matches the specified field. If the set of records does not include a field that matches the specified field, selecting, based on a set of rules, a field, different from the specified field, as a default field to filter, comparing values from the default field against the specified filter option, and generating, based on the comparison, a subset of records from the set of records for the dashboard component to summarize.

Disclosed herein is a system and method for propagating a global filter to one or more individual datasets by selecting from equivalent fields. In the following examples, reference is made to a CRM system hosted by a multitenant database system; however, the following examples are not intended to limit this disclosure to any one embodiment.

In an embodiment, the CRM system may provide various analytic and reporting mechanisms, including one or more dashboards. In an embodiment, a dashboard can contain one or more components, each of which may represent information of analytical value to business users viewing the dashboard. A dashboard can combine information across multiple (and often disparate) data sets, which makes filtering the dashboard a challenge.

Often, fields that filter the dashboard are limited to a few components, and in most cases those components must source data from the same data set. End users rarely get any feedback about which components are filtered and which are not, leaving them confused about the state of the information on the dashboard.

In an embodiment, a dashboard can contain one or more components, each of which represents information of analytical value to business users viewing the dashboard. A dashboard can comprise a combination of information across multiple (and often disparate) data sets (similar to views in a database), which makes filtering the dashboard a challenge. Often, fields applied to the dashboard can only filter a few components, and end users rarely get any feedback about which components are filtered and which are not, leaving them confused about the state of the information on the dashboard. This ambiguity may be eliminated by allowing users to filter the dashboard only on "common fields," i.e., fields that can filter all components on a dashboard.

For a field to be considered to be a common field (and hence available to be filtered on), it must have at least one possible mapping on every component (and hence every data set) on the dashboard. This criteria makes it possible to filter the entire dashboard on the selected field.

In an embodiment, once a "global filter" is defined on the common field, it needs to be propagated to individual components. As described above, each component may have one or more field mappings that can qualify as equivalent fields for the purpose of applying the fitter. The criteria for picking the default field for the fitter on each component and providing users the ability to change the default setting is described in this patent application and constitutes a novel approach to selecting a meaningful match among a set of multiple equivalent fields through a clearly identified sequence of rules whose order reflects the real world likelihood for this function. Once defaulted, the flexibility to change the default selection on each component:

a. enables users to pick a different field to use at any time;

b. keeps the defaulting logic simple and intuitive, addressing the most common use cases without complicating user experience;

c. accommodates a wide variety of cases not covered by the defaulting logic;

d. elegantly solves the scorecard use case by allowing users to use a different context for polymorphic fields such as date and user fields on each component; and e. allows users to change the field when the selected field is invalid or unavailable.

The following is a high level summary of the rules used to default a filter field on each component after the global filter is created. These rules are explained in more detail further below.

In an embodiment:

a. If the component (data set) has the field used to define the global filter then we will use that field to filter the component (even if there are other possible mappings). Exact match has precedence.

b. If there is no exact match then we look at other equivalent fields. As described above, each component may have one or more field mappings that can be considered equivalent to the global filter field, in which case we will use the rules described below to pick the default field.

i. If the component's data set has a single equivalent field to the global filter field then we will use that field as the default field to filter the component.

ii. If there is ambiguity (that is, multiple possible mappings are present),

1. The data set's structure will be traversed from the root object to the bottom including lookups at each level. This is the order of priority in which we will find an equivalent field that maps to the filter field since higher in the hierarchy more relevant the field may be for the data set.

2. If we find a mapping at the root then use that. If not, check the root object's lookups (lookups are 1:1 extensions on an object) in the order in which they were defined on the object.

3. If not found at the root level, traverse down the hierarchy and use the above logic at each level to find an equivalent field.

4. At any of the levels if there is more than one equivalent field then:

a. Select the field that's also used in the underlying report since there is a greater likelihood that a field used in the analysis is the field you may want to filter on (compared to other possible fields at the same level).

b. If there still is more than one equivalent field then pick the first one.

While one or more implementations and techniques are described with reference to an embodiment in which a method for propagating a global filter to individual datasets is implemented in a system having an application server providing a front end for an on-demand database service capable of supporting multiple tenants, the one or more implementations and techniques are not limited to multi-tenant databases nor deployment on application servers. Embodiments may be practiced using other database architectures, i.e., ORACLE®, DB2® by IBM and the like without departing from the scope of the embodiments claimed.

Any of the above embodiments may be used alone or together with one another in any combination. The one or more implementations encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

BRIEF DESCRIPTION OF THE DRAWINGS

In the following drawings like reference numbers are used to refer to like elements. Although the following figures depict various examples, the one or more implementations are not limited to the examples depicted in the figures.

DETAILED DESCRIPTION

Systems and methods are provided for propagating a global filter to individual datasets.

Figure 1:
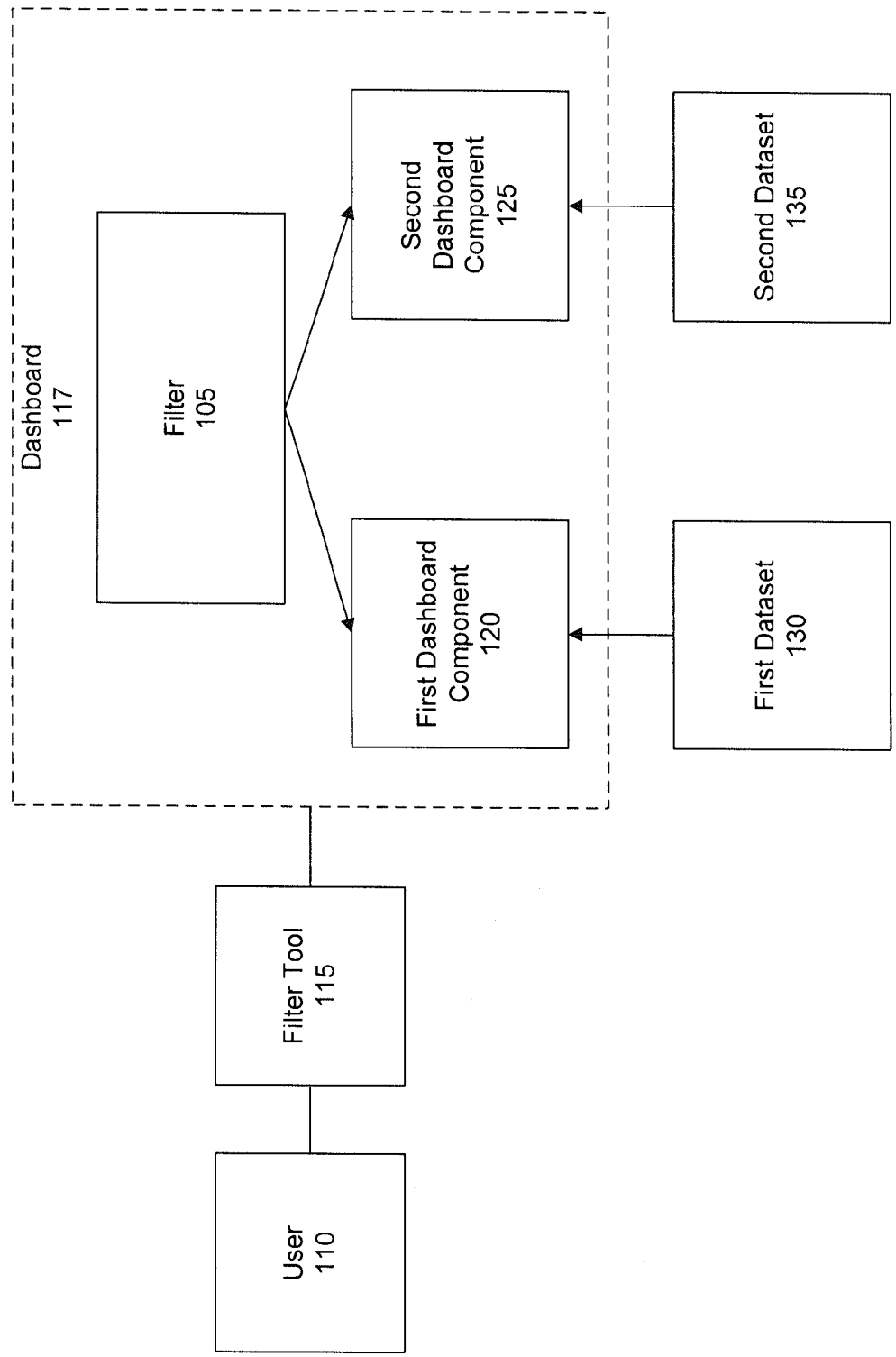
FIG. 1 illustrates a simplified block diagram of a filter being applied in an embodiment.

FIG. 1 shows a simplified block diagram of a system for creating a filter 105. Specifically, a user 110 uses a filter tool 115 provided by the system to create the filter. The filter can be used to limit the amount of information that is displayed. Filtering helps to focus analysis on just the data of interest. To create a filter, a user can select the field to filter on and input the filter criteria. Then, only data satisfying the filter criteria may be displayed.

In some cases, a user may be viewing a dataset that does not include the selected field. In a specific implementation, a feature of the invention provides a set of rules or heuristics to identify a field in the dataset that is related (e.g., equivalent or compatible) to the selected field. This field is selected to be the default field. The filter is applied to the default field. The output includes a subset of records from the dataset according to the filter criteria.

In a specific implementation, a filtering technique as described in this patent application is applied to one or more graphical widgets or elements that may be referred to as a component or a dashboard component. These components are displayed on a graphical user interface (GUI) that may be referred to as a dashboard 117. A dashboard is an interface that organizes and presents information in a way that is easy to read. In a specific implementation, a dashboard or a dashboard page is displayed on an electronic screen using a web browser.

A dashboard, through the components, can integrate information from multiple sources and present the information in a single, unified format. For example, a dashboard may include a component for business metrics or key performance indicators (KPIs) such as closed sales, large accounts, open cases, open issues, open deals, quarterly results, and so forth. Other examples of dashboard components include a news component, stock quote component, and many others. A dashboard component may include graphics including charts (e.g., pie chart, donut chart, funnel chart, bar chart, column chart, line chart, gauge or fuel gauge chart, or scatter chart), text, tables, or combinations of these.

As shown in the example of FIG. 1, filter 105 may be applied to first and second dashboard components 120 and 125. Dashboard components 120 and 125 summarize or provide summary views of first and second datasets 130 and 135, respectively. For example, first dashboard component 120 may provide a graphical summary of closed sales for the quarter. Second dashboard component may provide a graphical summary of open deals over a certain dollar amount. The first dataset may be different from the second dataset. Although FIG. 1 shows the filter being applied to two dashboard components, a filter may be applied to any number of dashboard components including one, two, three, four, five, six, seven, eight, nine, ten, or more than ten dashboard components.

In a specific embodiment, a data filtering system and technique as described in this patent application is implemented in a customer relationship management (CRM) product. An example of a CRM product is provided by salesforce.com of San Francisco, Calif. Salesforce.com is a leading enterprise cloud computing company that provides a cloud platform and apps to help employees collaborate easily and connect with customers. This patent application describes filtering in the context of a CRM product. It should be appreciated, however, that aspects of the system are applicable to many other products and industries including finance, government, health care, research, and virtually any scenario, environment, or application where it would be desirable to filter data.

Some benefits of the system include an intelligent dashboard filter that predicts what field the user would most like to filter on. Thus, rather than not filtering a dataset when the selected field to filter is not found, the system makes a reasoned decision on which field the user may want to filter, selects that field as the default field, and filters on the default field. A single filter can be applied to multiple datasets even in cases where the field identified to be filtered is not found in the dataset. Predicting the field the user is likely to filter on helps to improve the user experience (e.g., save time) because the user does not have to create individual filters for each dataset. Instead, the user can create a single global filter that can be applied to multiple datasets.

Figure 2:
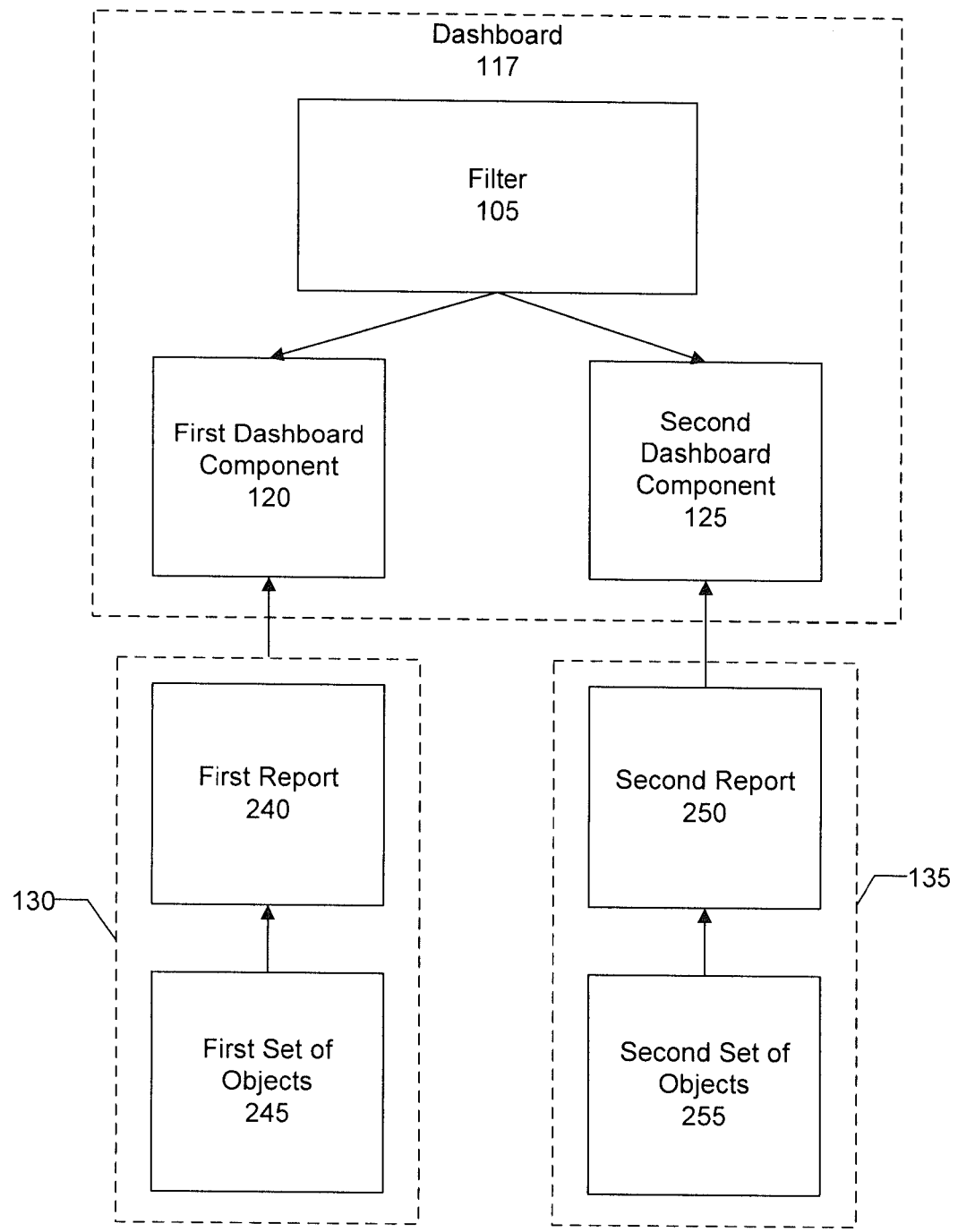
FIG. 2 illustrates a more detailed block diagram of the diagram shown in FIG. 2 in an embodiment.

FIG. 2 shows a simplified block diagram of some of the data structures underlying the dashboard components shown in FIG. 1. As shown in FIG. 2, in a specific implementation, first dashboard component 120 is based on a first report 240 which in turn is based on a first set of objects 245. Similarly, second dashboard component 125 is based on a second report 250 which in turn is based on a second set of objects 255.

The report returns a set of records from the set of objects that meet certain criteria. A report can join or link objects in order to present various views of the data. The records in a report may be displayed, organized, or arranged in rows and columns. Report data can be filtered, grouped, and displayed graphically as a chart. There can be a report type that defines the set of records and fields available to a report based on the relationships among the objects in the set of objects—and, more particularly, based on the relationships between a primary object and its related objects. Reports can display the subset of records that meet the criteria defined in the report type. Users can select which fields to include in a report.

Each dashboard component may be referencing a different set of objects and object relationships. For example, the first dashboard component may be referencing a first object to a second object. The second dashboard component may be referencing the first object to a third object. Another dashboard component may be referencing only the first object, and so forth.

In a specific implementation, when propagating a filter from the top to each individual component, techniques are provided for determining what field for each of these components the filter should be applied to. For example, in this specific implementation, the filter is not statically tied to specific field. Rather, there is a loose coupling between the filter and the field that the filter gets applied to in each component. This provides the flexibility to associate, for example, the accounts filter to the account name on one component, to the parent account on another component, to an opportunities account on another component, or a case account on another component.

Figure 3:
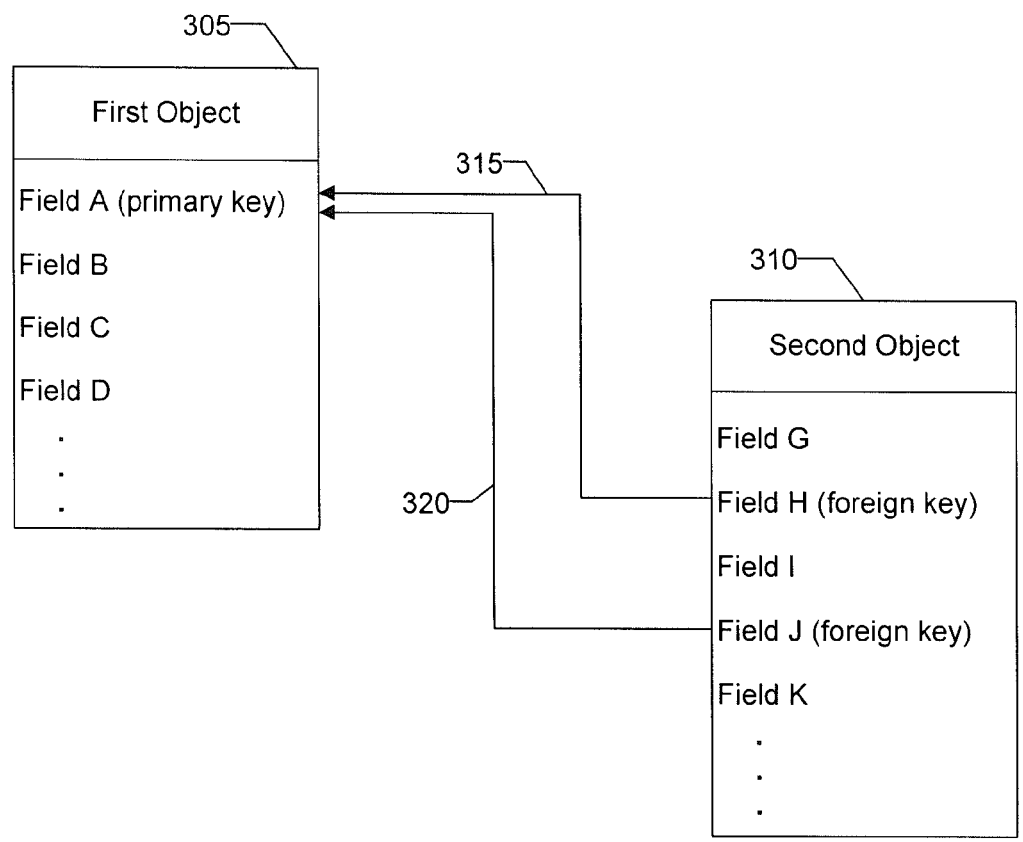
FIG. 3 illustrates a graphical example of how data objects in a data model may be joined.

FIG. 3 shows a graphical example or data model of objects and the relationships between the objects. As shown in FIG. 3, the objects may be organized in a hierarchy. A first object 305 may be referred to as a primary, base, or root object. A second object 310 is joined to the first object and may be referred to as a secondary object. First or primary object 305 includes fields A-D. Second or secondary object 310 includes fields G-K. The position of the fields indicates the order in which they were defined. For example, field H is listed above field J. Thus, field H was defined before field J. In other words, field J was defined after field H. Lines 315 and 320 represent the relationships between the objects.

An object may refer to a logical grouping of related data and program logic. For example, within the business context, there can be an opportunities object, an account object, a user object, a cases object, an activities object, and many more. FIG. 3 shows two objects and two levels of the object hierarchy. It should be appreciated there can be any number of objects and any number of levels.

In this example, field A in the first object is a primary key, and field H and field J in the second object are foreign keys. The foreign keys are related to the primary key. More particularly, as shown by line 315 field H maps to field A. As shown by line 320, field J maps to field A. Field H and field J may be referred to as equivalent fields because although the fields are different (e.g., have different field names), the fields map to the same object or primary key.

For example, the first object may be a user or employee object. Field A may store a name of the user, field B may store the user's address, field C may store the user's social security number, field D may store the user's phone number, and so forth. The second object may be an opportunities or sales object. Field G may store a name of the opportunity (e.g., Acme-Electrical Generator). Field I may store the opportunity status (e.g., open or closed). Field K may store the amount of the opportunity (e.g., $45,000).

Field H may store the identity of the opportunity owner. Field J may store the identity of the user who last modified the opportunity. Fields H and J in second object 310 map to the same first object 305 where the actual data item or value (e.g., name of the user) is stored. As discussed above, in a specific implementation, these mapping relationships or field mappings may be used to help identify a default field for the filter.

Figure 4:
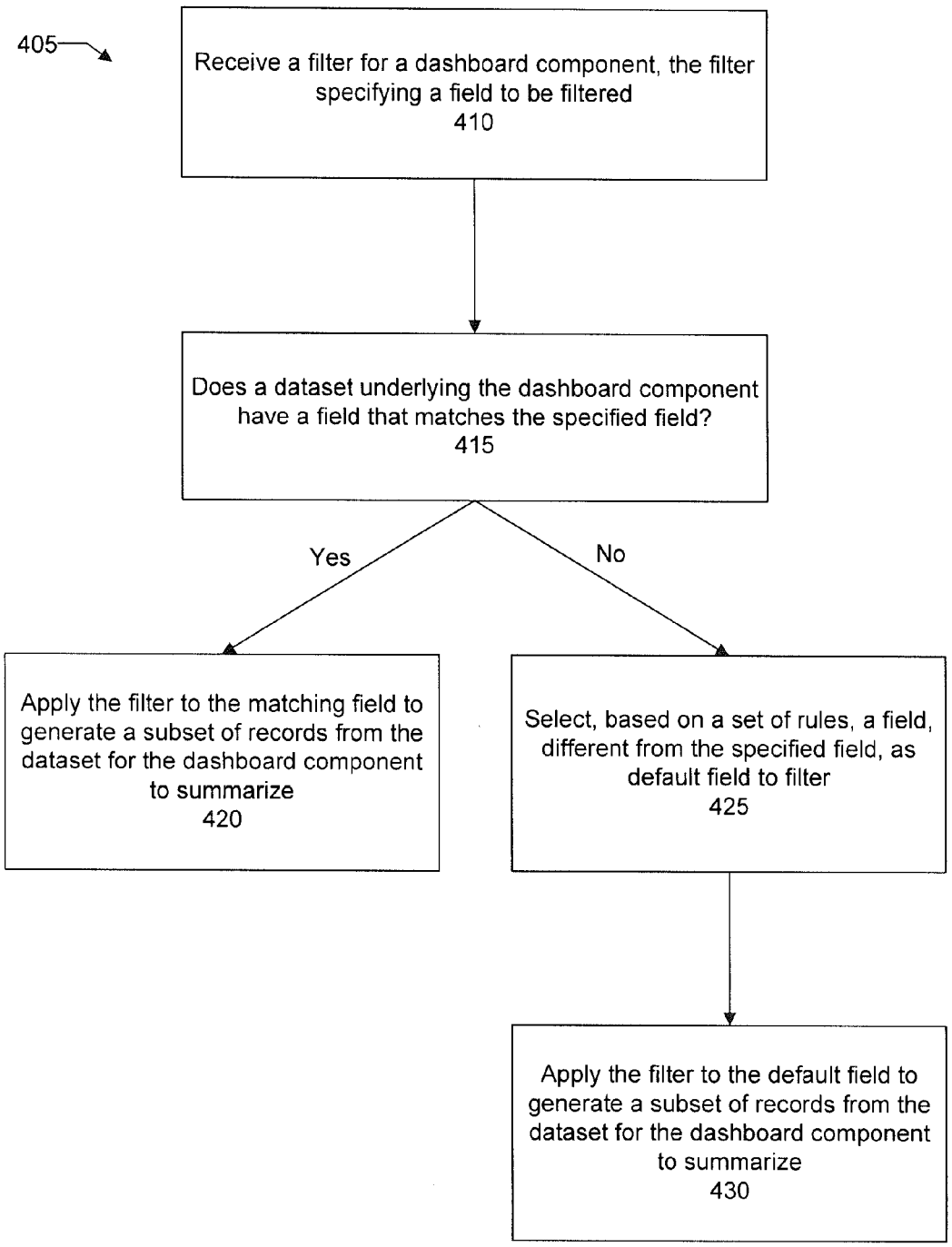
FIG. 4 illustrates an overall flow diagram for applying a filter to one or more datasets in an embodiment.

FIG. 4 shows an overall flow 405 for applying a filter to one or more dashboard components. Some specific flows are presented in this application, but it should be understood that the invention is not limited to the specific flows and steps presented. A flow of the invention may have additional steps (not necessarily described in this application), different steps which replace some of the steps presented, fewer steps or a subset of the steps presented, or steps in a different order than presented, or any combination of these. Further, the steps in other implementations of the invention may not be exactly the same as the steps presented and may be modified or altered as appropriate for a particular application or based on the data.

In a step 410, the system receives as user input a filter for a dashboard component. The filter may include a specification of a field, a filter option or criteria.

In a step 415, the system determines whether a dataset underlying the dashboard component has a field that matches the specified field. The system may scan or compare the specified field with each field in the dataset to determine whether there is a match. In a step 420, if a matching field is found in the dataset, the system applies the filter to the matching field to generate a subset of records from the dataset for the dashboard component to summarize. More specifically, the system evaluates the values stored or referenced in the field with the user's filter option or filter criteria.

For example, the user may wish to see information related to a particular employee, e.g., "Nick Jones." So, the user may specify the filter field to be "Employee Name" and the filter option or criteria to be "equals Nick Jones." If the dataset includes the field "Employee Name," this field is selected as the field to apply the filter criteria. Records in the dataset that satisfy the filter option may be included in the subset of the dataset. Records in the dataset that do not satisfy the filter option may be excluded or omitted from the subset, e.g., filtered out from the dataset. Thus, the subset would include records where the "Employee Name" field stored (or referenced) the value "Nick Jones."

Alternatively, in a step 425, if the dataset does not include a field that matches the specified field, the system selects, based on a set of rules or heuristics, a field different from the specified field as a default field to filter. In a step 430, the system applies the filter to the default field to generate a subset of records from the dataset for the dashboard component to summarize. Applying the filter to the default field may proceed in a manner similar to applying the filter to a matching field.

In continuing with the example above, assume that the dataset does not include the field "Employee Name." The dataset, however, includes the field "Account Owner" which maps to the same user object as "Employee Name." In this case, the field "Account Owner" may be considered to be an equivalent field and the filter is applied to the "Account Owner" field. That is, records in the dataset where the "Account Owner" field includes or references the value "Nick Jones" may be included in the subset of the dataset. Records in the dataset where the "Account Owner" field does not include or reference the value "Nick Jones" may be excluded or omitted from the dataset.

Figure 5:
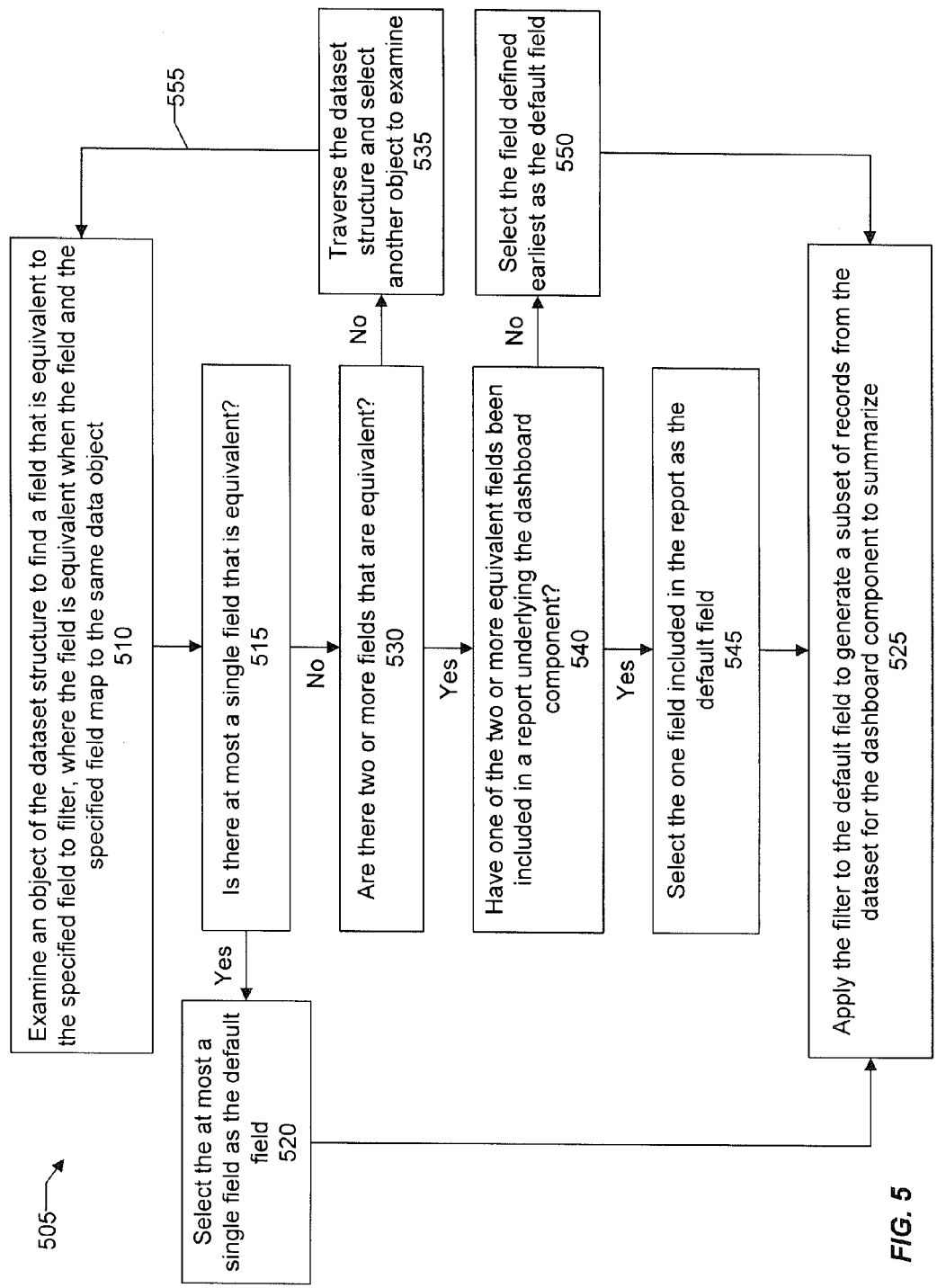
FIG. 5 illustrates a flow diagram for selecting a default field to filter in an embodiment.

FIG. 5 shows a more detailed flow 505 of the set of rules for identifying a field in the dataset to be used as a default field for the applying the filter. A rule may include an expression, condition, an action to be executed when the condition is (or is not) satisfied, or combinations of these, e.g., "if <condition=TRUE> then <first action> else <second action>."

In a step 510, the system examines an object of the dataset structure to find a field that is equivalent to the specified field. The object may be a primary, base, or root object of the dataset. As discussed above, a field may be considered equivalent when the field and the specified field map to the same data object.

In a step 515, the system determines whether there is at most a single field that is equivalent. In a step 520, if there is at most a single field that is equivalent, the field is selected as the default field. In a step 525, the filter is applied to the default field to generate a subset of records from the dataset for the dashboard component to summarize (see step 430—FIG. 4).

In a step 530, if there is not at most a single equivalent field, the system determines whether there are two or more fields that are equivalent. In a step 535, if there are not two or more fields that are equivalent (i.e., the object under analysis does not include any equivalent fields), the system traverses down the dataset structure and selects another object to examine. The selected other object is the next related object in the dataset object hierarchy. The process then loops 555 back to step 515. As described in the discussion accompanying FIG. 3, there can be many different levels, sub-levels, sub-sub-levels, and so forth of objects in the dataset hierarchy. Thus, depending on factors such as the structure of the dataset objects, and the number of levels in the hierarchy, the system may iterate through steps 510, 515, 530, and 535 multiple times (e.g., two or more iterations).

In a step 540, if there are two or more fields that are equivalent, the system determines whether one of the two or more fields had been included in a report underlying the dashboard component. In a step 545, if the one of the two or more fields had been included in the report, the system selects the one field included in the report as the default field. The filter is then applied to the default field (step 525). A field that a user chooses to include in the report can indicate that the user considers the field to be important since the user has decided to see or include the field in the report.

In a step 550, if one of the two or more fields had not been included in the report, the system selects from among the two or more fields the field that was defined first or earliest to be the default field. The filter is then applied to the default field (step 525). A field defined before another field can indicate that the user considers the former field (i.e., the field defined earlier) to be more important than the field defined later or after the field defined earlier.

In a specific implementation, the order of rule evaluation is as shown in FIG. 5. It should be appreciated, however, that depending upon the application, the rules may be evaluated in a different order than what is shown in FIG. 5, there may be additional rules, some rules may be omitted, or combinations of these. For example, in another specific implementation, a rule may specify that an equivalent field that was defined after another equivalent field should be selected as the default field to filter. The order of rule evaluation may be user-configurable so that users can customize the rules, order of evaluation, or both as appropriate for their application or organization. This allows the flexibility of one organization having a default field heuristic that is different from another organization.

In a specific implementation, a method includes receiving a filter specifying a field to filter. Upon applying the filter to a dataset, determining that the specified field is not in a first data object of the dataset. Scanning the first data object to find one or more fields that map to a same data item as the specified field, the one or more fields being foreign keys. If the one or more fields are found in the first data object, designating one of the one or more fields as a default field and filtering the dataset using the default field. If the one or more fields are not found in the first data object, scanning a second data object of the dataset to find the one or more fields, wherein the second data object is a secondary data object to the first data object.

Figure 6:
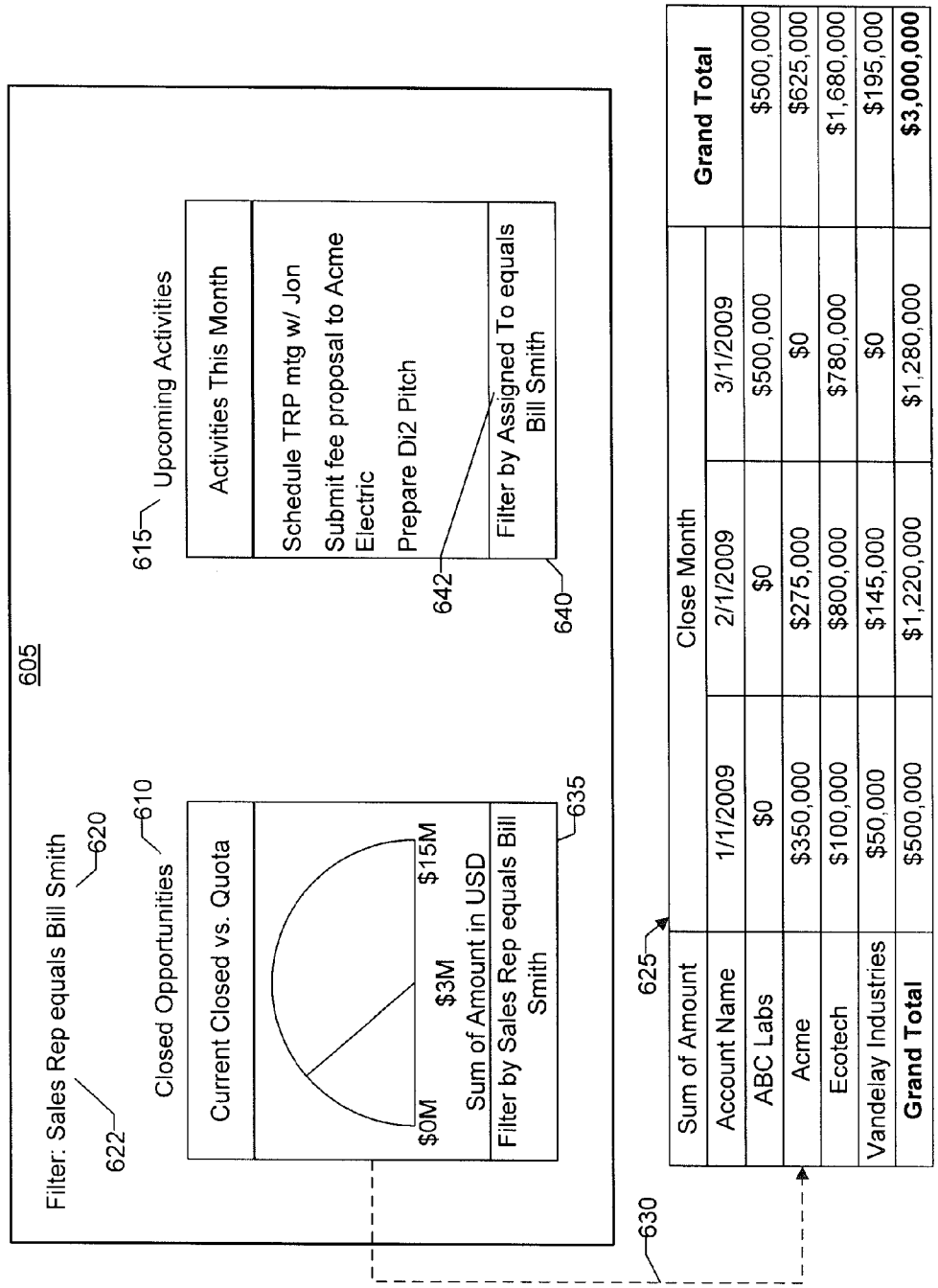
FIG. 6 illustrates a schematic example of a filter having been applied to components of a dashboard.
Figure 7:
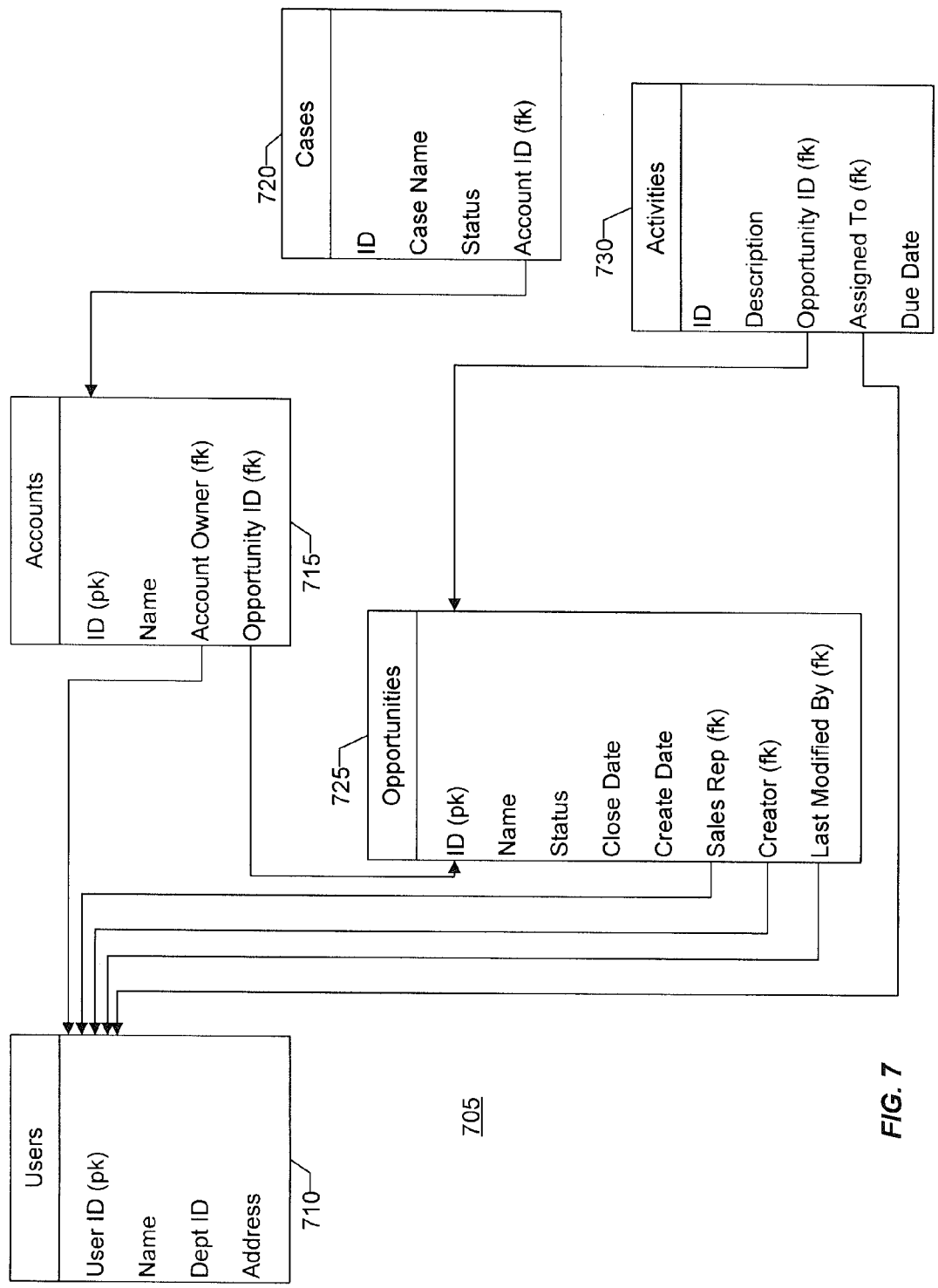
FIG. 7 illustrates an example of a data model that may be underneath the dashboard shown in FIG. 6.

FIG. 6 shows a schematic example of a dashboard 605. FIG. 7 shows some of the data structures and objects for the dashboard. As shown in FIG. 6, dashboard 605 includes a first dashboard component 610, a second dashboard component 615, and a filter 620. A report 625 provides the underlying source data for the first dashboard component as indicated by a broken line 630. Filter 620 may be referred to as a global filter because it is intended to be propagated or applied to each of the components shown on the dashboard.

In a specific implementation, the dashboard shows data from source reports as visual components. As discussed above, the components can include charts, gauges, tables, metrics, and the like. A dashboard component can provide a snap shot of key metrics and performance indicators for the organization. The dashboard component can provide a summary view of the underlying report according to one or more metrics. The underlying report, in turn, may be based on a query that pulls data from any number of objects.

In this example, filter 620 specifies a field 622 "Sales Rep," and filter option or criteria "equals Bill Smith." The filter has been applied to each of the dashboard components to filter the underlying datasets according to the filter option.

First dashboard component 610 displays a fuel gauge chart summarizing the dollar amount of closed opportunities versus the quota amount. A region 635 of the first dashboard component indicates that dashboard component has been filtered to show the closed opportunities for the sales representative "Bill Smith."

More particularly, the first dashboard component is based on an underlying source dataset or report 625. The report may be based on a query that pulls data from various objects. The report in this example is arranged in a matrix layout having a set of rows and columns. The report provides a month-by-month break-down of the amount of closed opportunities for each account listed in the first column. There are totals across a row to show the total amount of closed opportunities per account, totals down a column to show the total amount of closed opportunities per month, and a grand total to show the total amount of closed opportunities.

The underlying report includes that subset of records from the dataset which satisfy the filter option, i.e., where values stored or referenced in the sales representative field of the dataset equals "Bill Smith."

Second dashboard component 615 displays a listing of upcoming activities. Filter 620 has also been applied to the second dashboard component. As indicated, however, in a region 640 below the second dashboard component, the filter option ("equals Bill Smith") has been applied to a field 642 "Assigned To." That is, although the specified field to filter is "Sales Rep," the filter has been applied to a different field or a field different from the specified field to filter, i.e., "Assigned To." In this example, the reason is because the dataset upon which the second dashboard component is based does not include the field "Sales Rep." Based on a set of rules (see FIG. 5 and accompanying discussion), the "Assigned To" field has been selected as the default field to filter. Thus, the second dashboard component displays a list of the upcoming activities that are assigned to "Bill Smith."

In a specific implementation, region 640 includes an option or graphical control for the user to select a different field to filter. For example, the user may not desire to filter on the default field selected by the system and may wish to filter on a different field. The graphical control may be a dropdown list that displays a list of other fields that are available for the filter.

FIG. 7 shows an example of a data model 705 that may be underneath dashboard 605 shown in FIG. 6. As shown in FIG. 7, there is a user object 710, an accounts object 715, a cases object 720, an opportunities object 725, and an activities object 730.

Each object may be related to one or more other objects. Specifically, the opportunities object includes foreign keys ("fk") SalesRep, Creator, and LastModifiedBy that map to the primary key ("pk") UserID in the user object. The accounts object includes the foreign keys AccountOwner and OpportunityID. AccountOwner maps to the UserID in the user object. OpportunityID maps to ID in the opportunities object. The cases object includes the foreign key AccounID which maps to the primary key ID in the accounts object. The activities object includes the foreign keys OpportunityID and AssignedTo. OpportunityID maps to the primary key ID in the opportunities object. AssignedTo maps to the primary key User ID in the users object.

As shown in FIG. 7, the activities object does not include a field that matches the specified filter field, i.e., SalesRep. In this example, however, the system has identified the AssignedTo field as being an equivalent field because AssignedTo and SalesRep map to the same data object, i.e., UserObject.UserID. The system has selected the AssignedTo field as the default field to filter because, in this example, there are no other equivalent fields to consider (see steps 510, 515, 520, and 525 in FIG. 5).

FIGS. 8-20 show some screen shots of a specific implementation of a graphical user interface (GUI) for creating and propagating a global filter. In this specific implementation, the screenshots are of web pages displayed on an electronic screen or display to a user. The web pages are generated by a CRM product provided by salesforce.com of San Francisco, Calif. It should be appreciated, however, that the tool may be implemented in any computer product. These screenshots and the accompanying description are provided merely as a sample implementation.

It should be understood that the invention is not limited to the specific examples and features presented. A system of the invention may have additional features (not necessarily described in this application), different features which replace some of the features or components presented, fewer features or a subset of the features presented, or features in a different order than presented, or any combinations of these. Aspects (e.g., screens or web pages) of the invention may be modified or altered as appropriate for a particular application, industry, business, or use. It should be appreciated that the invention is not limited to the specific GUI controls, widgets, objects, elements, containers, icons, windows, views, navigation, help text, and layouts shown in the screenshots. Various specific implementations may include GUI elements such as floating windows, modal windows, palette or utility windows, pop-up boxes, dialog boxes, frames, list boxes, context menus, sliders, spinners, menu bars, combo boxes, scroll bars, tabs, tree views, grid views, tooltips, balloon help, infobars, links, buttons, icons, and the like.

Figure 8:
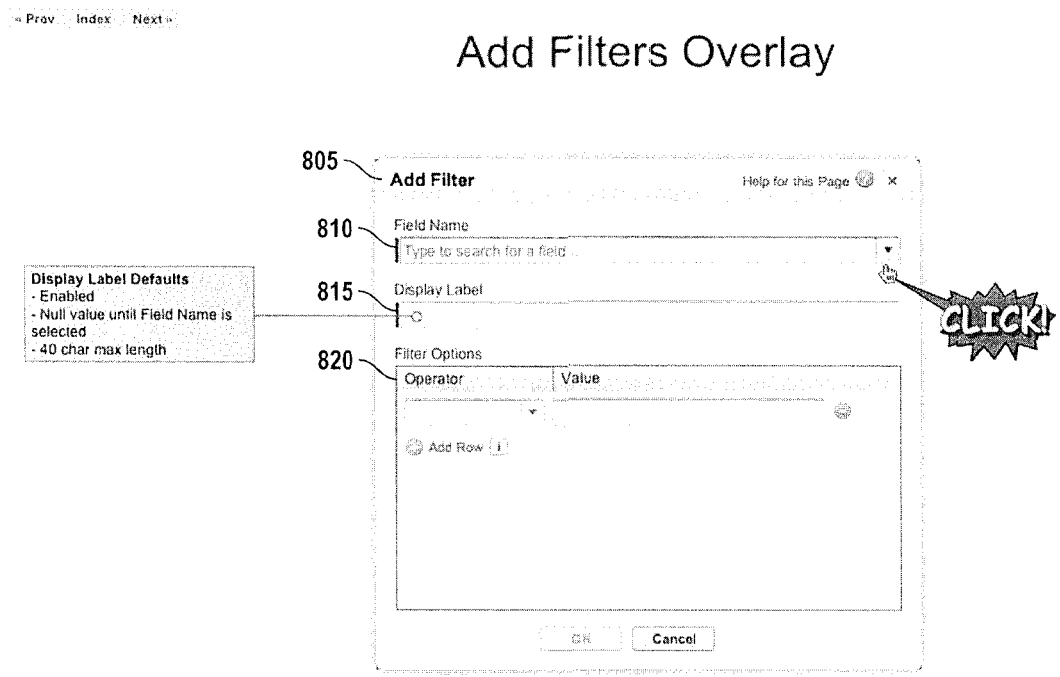
FIG. 8 illustrates a screenshot of an add filters overlay in an embodiment.
Figure 9:
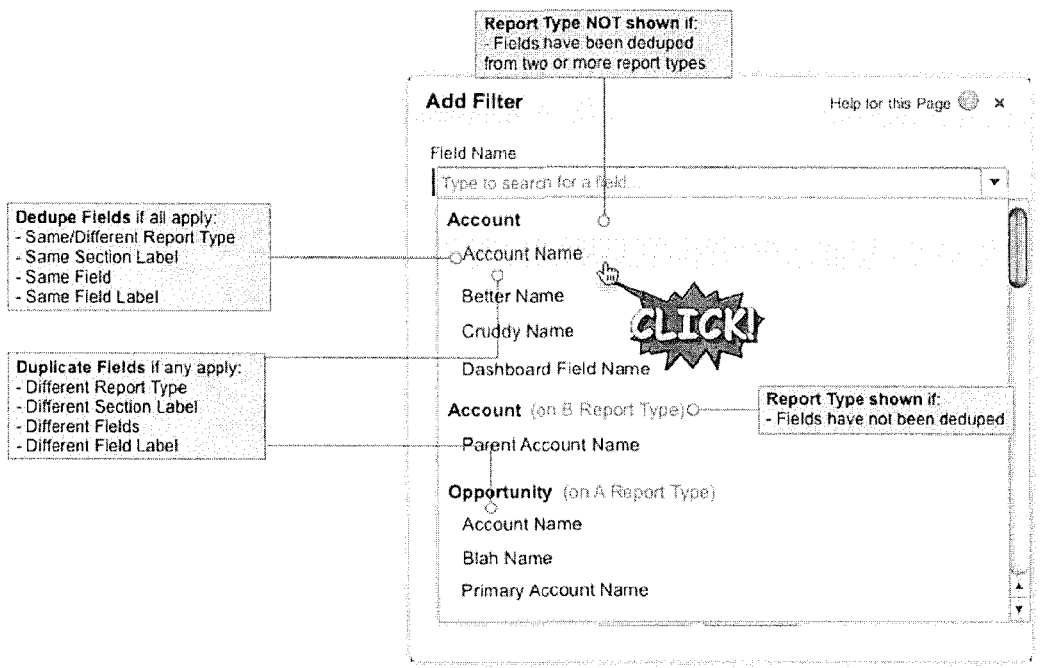
FIG. 9 illustrates a screenshot of a GUI for choosing filter fields in an embodiment.

FIG. 8 shows a screenshot of an Add Filters Overlay 805. The overlay may be displayed upon clicking an Add Filter control or button. The overlay includes a field name input box 810, a display label input box 815, and a filter options input box 820.

Input box 810 allows the user to enter the field that is to be filtered. There is a drop-down that shows fields that can be used to filter all the dashboard components (see FIG. 9). Input box 815 allows the user to enter a display label for the filter.

Figure 10:
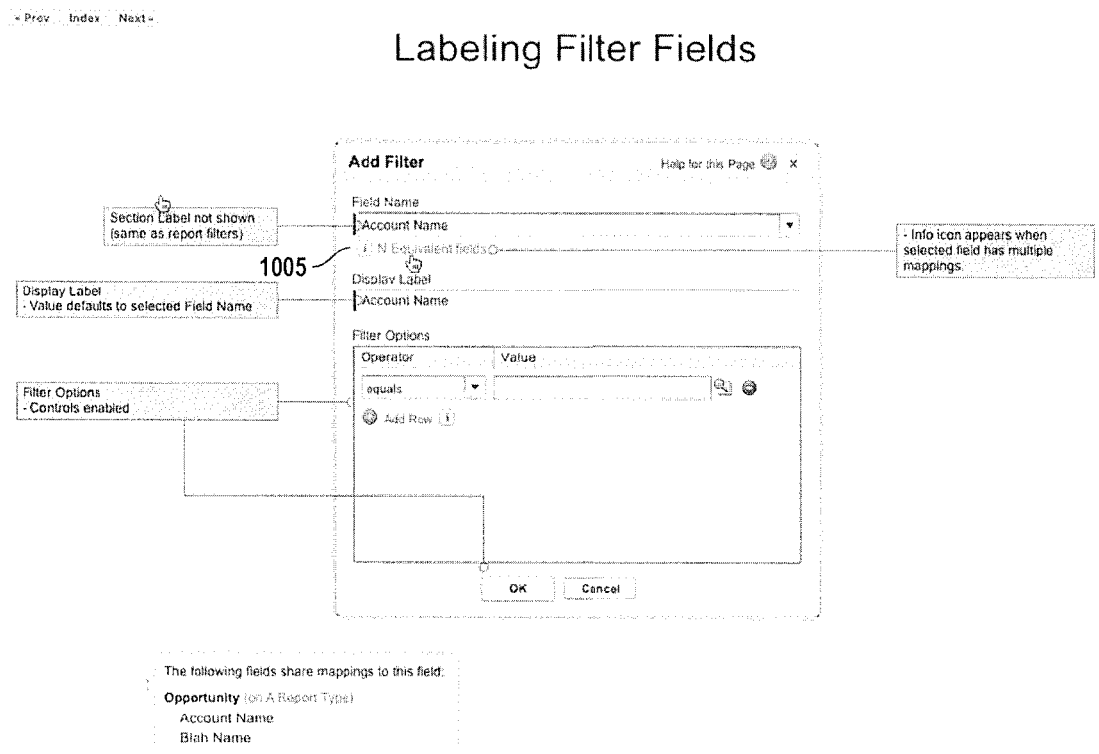
FIG. 10 illustrates a screenshot of a GUI labeling filter fields in an embodiment.
Figure 11:
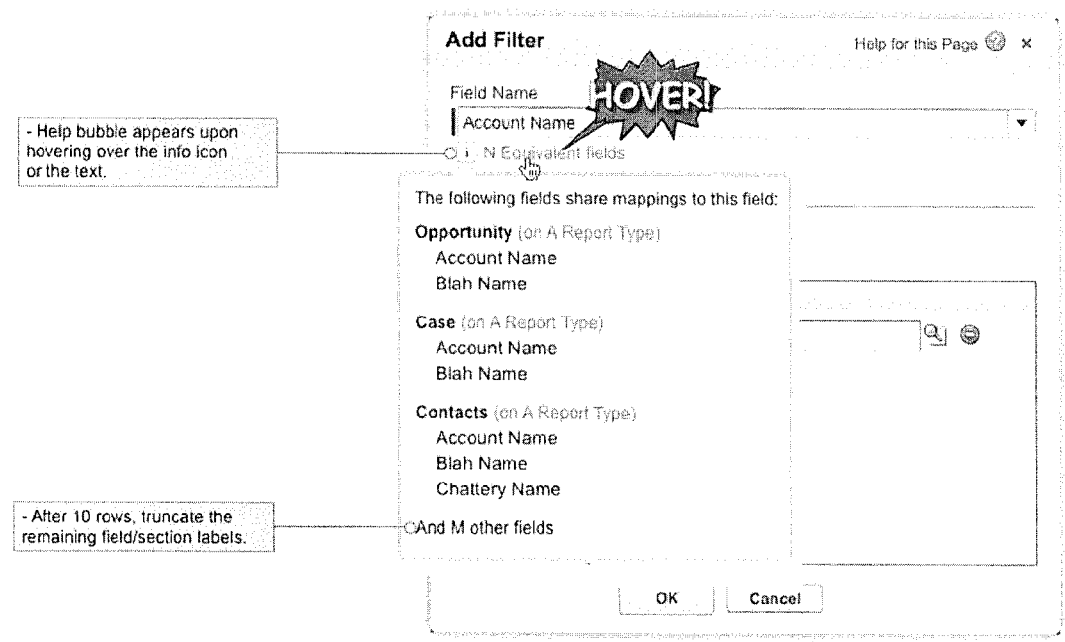
FIG. 11 illustrates another screenshot of a GUI for labeling filter fields in an embodiment.

FIG. 10 shows a screenshot for labeling filter fields. In a specific implementation, the overlay includes a control 1005 which can be clicked to show the equivalent fields for the field selected to be filtered. A number of the equivalent fields may displayed adjacent to the control. For example, as shown in FIG. 11, upon clicking control 1005, a popup window or dialog box is displayed which lists the fields that share mappings to the field selected in the field name input box.

Figure 12:
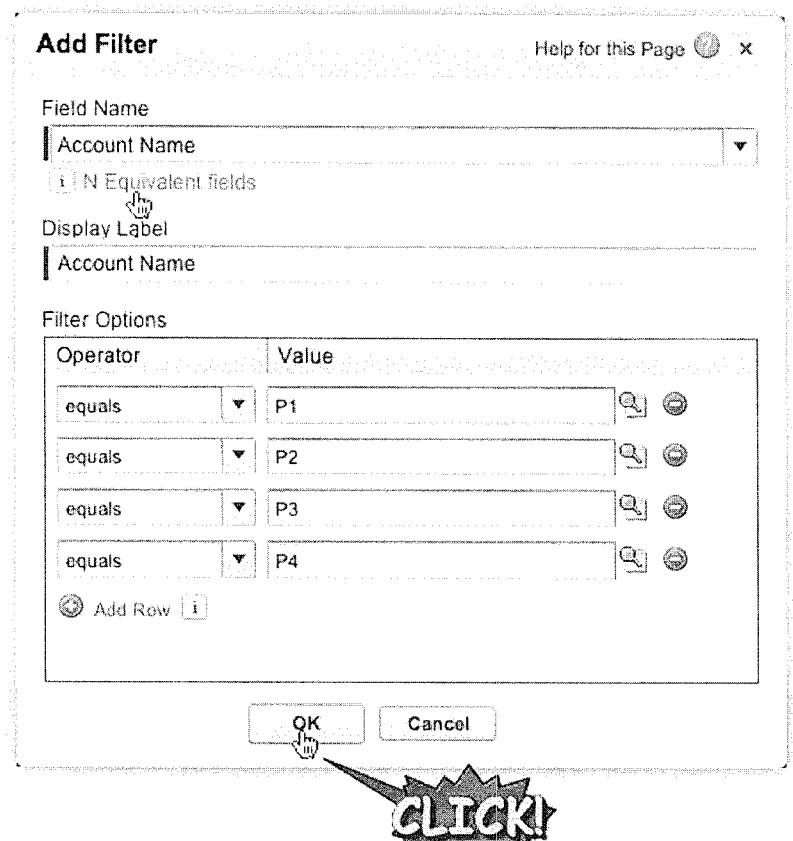
FIG. 12 illustrates a screenshot of a GUI for adding filters in an embodiment.

FIG. 12 shows a screenshot for inputting filter options or filter criteria. A filter option may include an operator and corresponding value. Some examples of operators that the user may choose include equals, less than, greater than, less or equal, greater or equal, not equal to, contains, does not contain, starts with, includes, excludes, and between. A filter may include filter logic such as an OR condition, an AND condition, or both.

Figure 13:
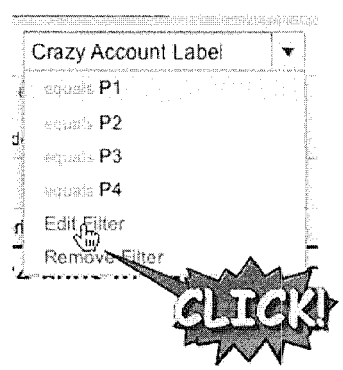
FIG. 13 illustrates a screenshot of a GUI for editing filters on viewer in an embodiment.
Figure 14:
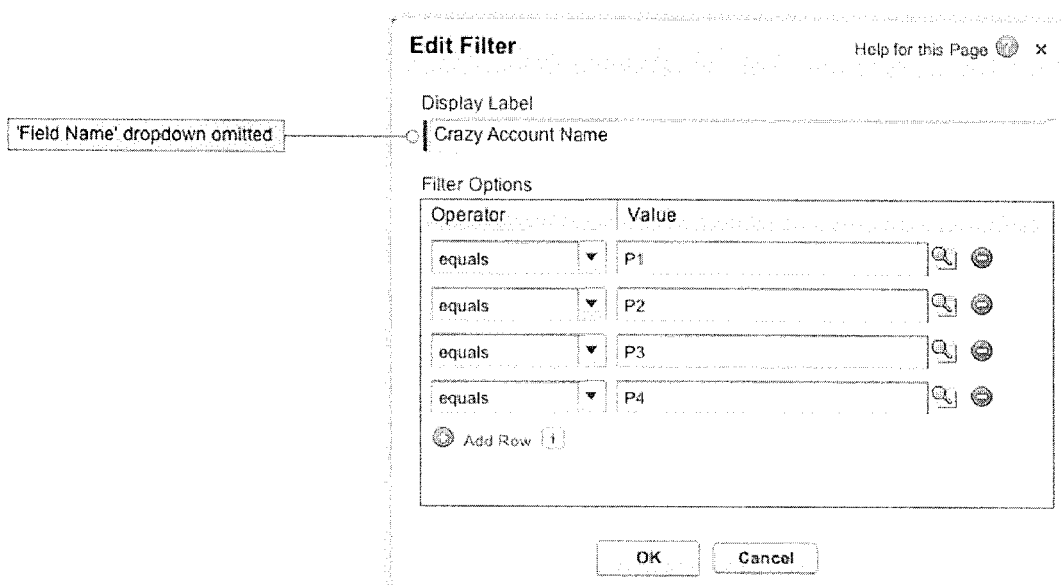
FIG. 14 illustrates a screenshot of a GUI for an edit filters overlay in an embodiment.
Figure 15A:
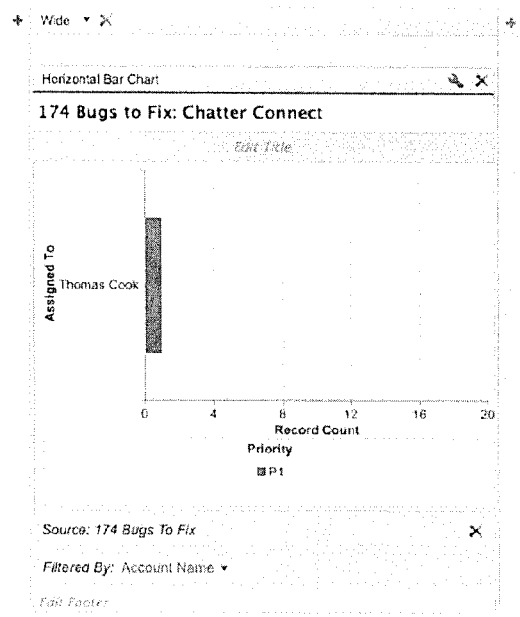
FIG. 15A illustrates a screenshot of a dashboard component GUI for equivalent fields on components in an embodiment.
Figure 15B:
FIG. 15B illustrates a screenshot of a filter GUI in a first state for the dashboard component.
Figure 15C:
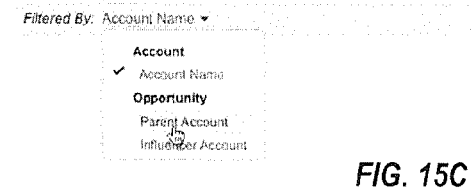
FIG. 15C illustrates a screenshot of the filter GUI in a second state.
Figure 15D:
FIG. 15D illustrates a screenshot of the filter GUI in a third state.
Figure 15E:
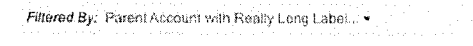
FIG. 15E illustrates a screenshot of the filter GUI in a fourth state.
Figure 15F:
FIG. 15F illustrates a screenshot of the filter GUI in a fifth state.

FIG. 13 shows a screenshot for editing a filter. FIG. 14 shows another example of a screenshot of the edit filters overlay. FIGS. 15A-15F show screenshot of various GUIs for equivalent fields on components. More particularly, FIG. 15A shows an example of a dashboard component. This example of the dashboard component uses a horizontal bar chart to summarize the number of bugs to fix. The underlying dataset has been filtered by "Account Name." As shown in FIG. 15A, the filter includes a drop down list or menu that allows the user to select a different field to filter. For example, FIG. 15B shows the filter menu in a first state. The user can hover over or click the menu to expand or open the menu. FIG. 15C shows the filter menu in a second or open state. FIG. 15D shows the filter menu in a third or closed state. FIG. 15E shows an example of a fourth state for the filter menu where the filtered field has a label name that is very long. FIG. 15F shows the filter menu in a fifth state where there are no filter options.

Figure 16:
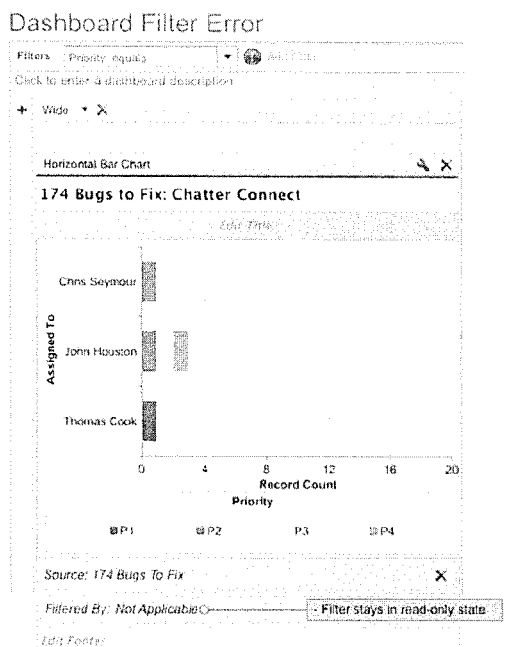
FIG. 16 illustrates a screenshot of a GUI for a first error state for component filters in an embodiment.
Figure 17:
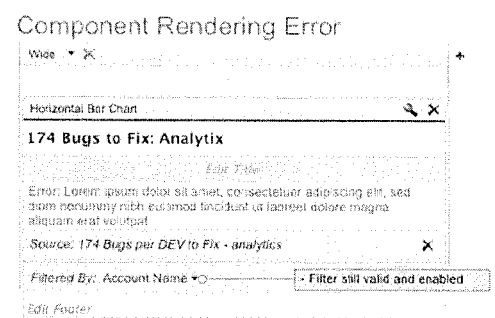
FIG. 17 illustrates a screenshot of a GUI for a second error state for component filters in an embodiment.
Figure 18:
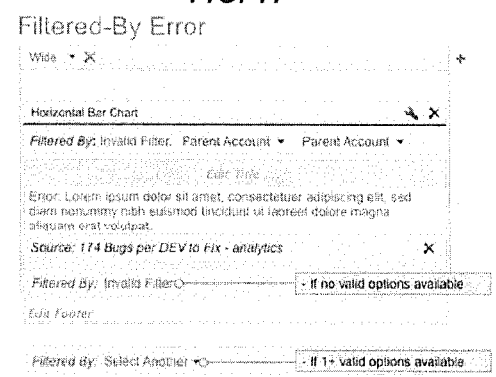
FIG. 18 illustrates a screenshot of a GUI for a third error state for component filters in an embodiment.

FIGS. 16-18 show some error states for component filters. FIG. 16 shows a screenshot of a dashboard component where the filter is not applicable. FIG. 17 shows a screenshot where there has been an error rendering the component. FIG. 18 shows a screenshot where the field to be filtered is invalid. For example, this error may occur when the data model has been modified after the filter has been created. In other words, the field to be filtered may have been deleted from the data model.

Figure 19:
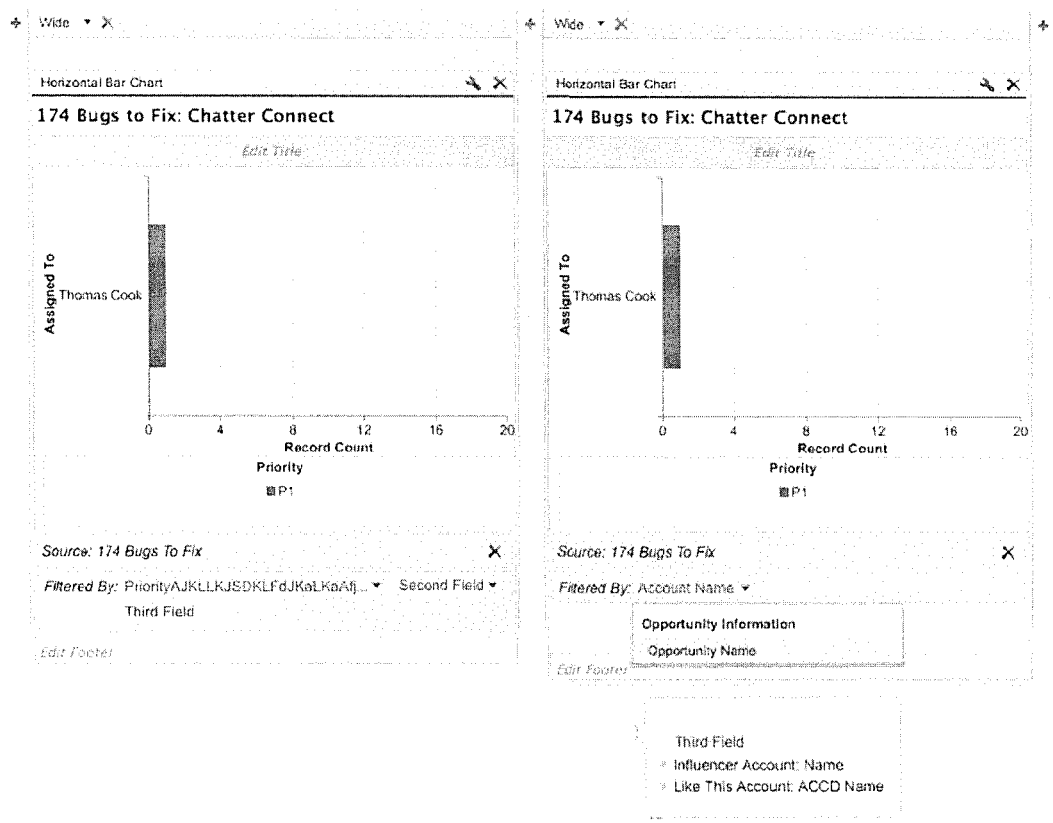
FIG. 19 illustrates a screenshot of a GUI for displaying filtered fields on components in an embodiment.
Figure 20:
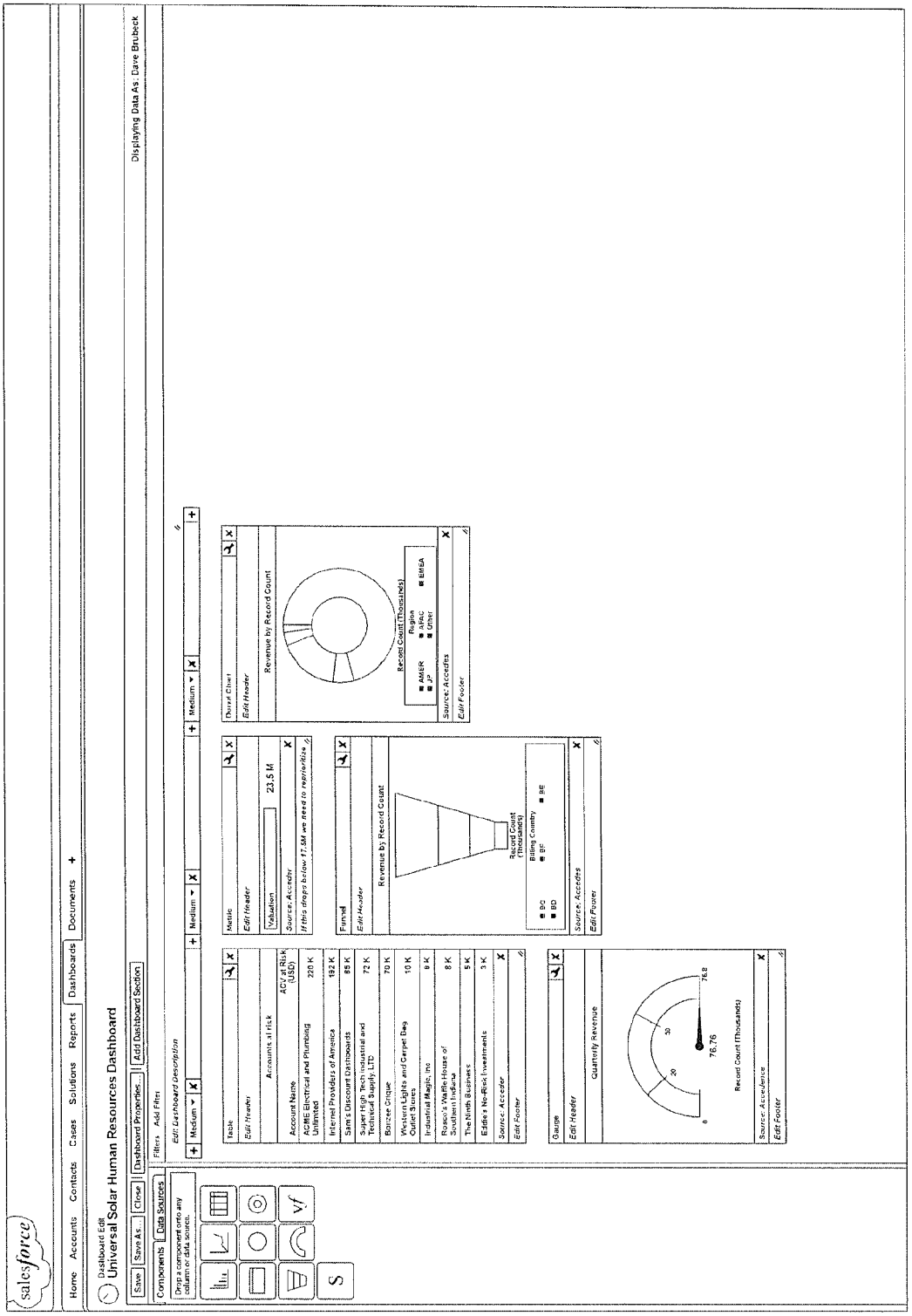
FIG. 20 illustrates a screenshot of a GUI for a dashboard in an embodiment.

FIG. 19 shows a screenshot for displaying filtered fields on components. FIG. 20 shows a screenshot of a dashboard having a set of dashboard components that have been filtered by the global filter.

The following describes some of the functional aspects of a specific embodiment of this disclosure. As discussed above, an embodiment of this disclosure is directed to the display of available filter fields on a "filter overlay." In this specific embodiment, all relevant fields will be available for users to create a filter, including fields that have multiple possible mappings. Once the filter is created, the field that will be used to filter each dashboard will be identified, thereby setting the default filter field mapping on each component.

A user can then change the filter field mapping on each component and filter on a different field, where possible. Essentially, when there is ambiguity, an embodiment will provide "intelligence" on resolving ambiguity, but still providing users with the flexibility to change the default mapping at the component level.

Common Fields Across Report Types

In an embodiment, entity objects common to all report types on the dashboard may be considered "common objects" for the purpose of determining common fields (e.g., Accounts, Opportunities, etc.).

On each report type, objects in the report type join hierarchy and all their lookups (also treated as objects) are the objects of interest. All entity fields on the common entity objects that have at least one mapping on each report type are considered common fields for creating filters on the dashboard (e.g., Accounts: Account Name). This may help ensure that every component is "filterable" on the common fields.

Fields from each report type that map to the above entity fields are then shown in the list of available fields on the filter overlay. Some of the entity fields may have multiple mappings on each report type in which case all possible mappings are shown. If one or more reports on the dashboard are not "accessible" then those may be ignored for the purpose of finding common objects/fields.

Filter creation and fields in the drop-down (filter overlay)—see FIGS. 8-20 for examples of a user interface for filter creation and filter overlay.

Default Filter Field Mapping on Each Component

In an embodiment, once a filter is created on the overlay, a determination is made on how to apply the filter on each component. The following examples describe various potential determinations:

a. If the component's report type has the filter field, then the field will be used to filter the component (even if there are other possible mappings). Exact match has precedence.

b. If there is no exact match then possible mappings on the component's report type are explored. As described above, filter fields may have multiple mappings on each report type (and, hence, on each component) in which case various rules may be applied (described below) to select the default filter field for each component which users can change.

c. If the component's report type has a single mapping to the filter field then that field will be used to filter the component.

d. If there is ambiguity (that is, multiple possible mappings are present):

i. The report type will be traversed from the root object to the bottom of the join hierarchy including lookups at each level. This is the order of priority in order to find a report type column that maps to the filter field.

ii. If a mapping on the root object is found, then that mapping will be used. If not, the root object's lookups (in the order in which they were defined on the report type) will be checked.

iii. If not found at the root level, traverse down the join hierarchy and use the above logic at each level to find a mapping to the filter field.

iv. At any of the levels if there is more than one report type column that maps to the filter field then
      1. Select the report type column that is also used in the underlying report.
      2. If there still is more than one report type column then pick the first matching column in the report type.

e. This mapping happens when the filter is created and is not dynamically recalculated or changed at any later point.

Changing Filter Field Mapping on Each Component

In an embodiment, the current filter field mapping on each component will be displayed. For components whose report types have multiple possible mappings for the filter field, users may have the option to change the filter field mapping (e.g., Opportunities: Accounts: Account Name to Opportunities: Primary Partner: Account Name, etc.). One will appreciate that a filter field may be mapped to a different report type column in one component and a different column in another component even though both the components use the same report type.

Labeling filter fields—see FIGS. 8-20 which provide examples of how filter fields might be labeled.

The following discloses various technical aspects for a specific embodiment of this disclosure. As noted above, in a specific embodiment, dashboard components are based on aggregated data from a report run in the context of a given running user. Data aggregation (groupings and summaries) is derived from report chart definition. This data is calculated when refresh requests are issued and then stored in the database and used when the dashboard is displayed. Components refresh requests, refresh information and data are keyed by reportId and runningUserId, and as a consequence can be shared by components in the same dashboard as well as across dashboards. Regular dashboards use a running user configured at the dashboard level, RARU/RASU dashboards use either the logged-in user or a user selected by the logged-in user among its subordinates.

In an embodiment, "parametrized dashboards" will have dashboard defined drop down parameter value lists that let users apply additional filters to the underlying reports. For example, if the underlying report returns data for the US, the dashboard could be parametrized to let the users view its data per state. In an embodiment, parameters will apply to subsets of dashboard components (groups), groups are disjoint and can not be nested, but more than one parameter can be defined per group. In an embodiment, a dashboard may define data aggregation needed from reports as opposed to being limited to a report's chart defined aggregations.

In an embodiment, the following features are implemented:

a. no performance regression for existing dashboard features b. use the same refresh request tracking and data access for all dashboards (for simplicity and maintenance)

c. keep sharing data between components with same data source definition within same dashboard (for both performance and consistency within dashboard)

d. keep refresh request info decoupled from config info (simplifies dashboard lifecycle handling when dashboard definition changes while refresh requests are pending)

e. once dashboard is refreshed, less than 2 seconds to get up to date view when choosing a different parameter value. (helps to enhance user experience)

To implement one or more embodiments of this disclosure, "refresh request" may be uniquely identified not only by reportId and runningUserId but also all other information required to override report definition (groupings, summaries, and filters). Dashboard_id may also be added to this execution context to resolve issues in which only a few components of a dashboard can be refreshed as a side effect of another dashboard using the same (report, user) being refreshed, thereby simplifying dashboard data lifecycle handling.

In an embodiment, requested groupings and summaries will be explicitly set in the execution context, even for components explicitly configured to use the same chart definition as the report. When only grand total is needed, groupings and summaries will be left empty.

In an embodiment, components form the same dashboard using exactly the same dashboard, running user, report, groupings and summaries (and filters if applicable) will share the same dataset. However, sharing datasets among components may be further simplified, e.g., two components using same groupings but different summaries, or sharing the same summary but grouped by FY/Region vs FY only or grand total only. This optimization would imply dealing with non-trivial corner cases when clipping happens but could be considered in the future though if production stats show it is worth it. For example, at refresh request time, the component whose refresh requests can be shared would be identified. At view time, load all execution contexts for given org/user/report/dashboard and use java logic to retrieve which one can be used by given component.

In an embodiment, applied filters will be identified by their id in a dashboard specific dashboard_filter_table, and these filter items will be immutable so that storing only their id in the execution context keeps it immutable as well. A fixed number of filters per execution context (e.g., 3) will be supported, so that the execution context can be stored in a single table row.

In a specific implementation, a method includes defining a global filter on at least one common field on a dashboard; and, propagating the filter to at least one component on the dashboard.

Figure 21:
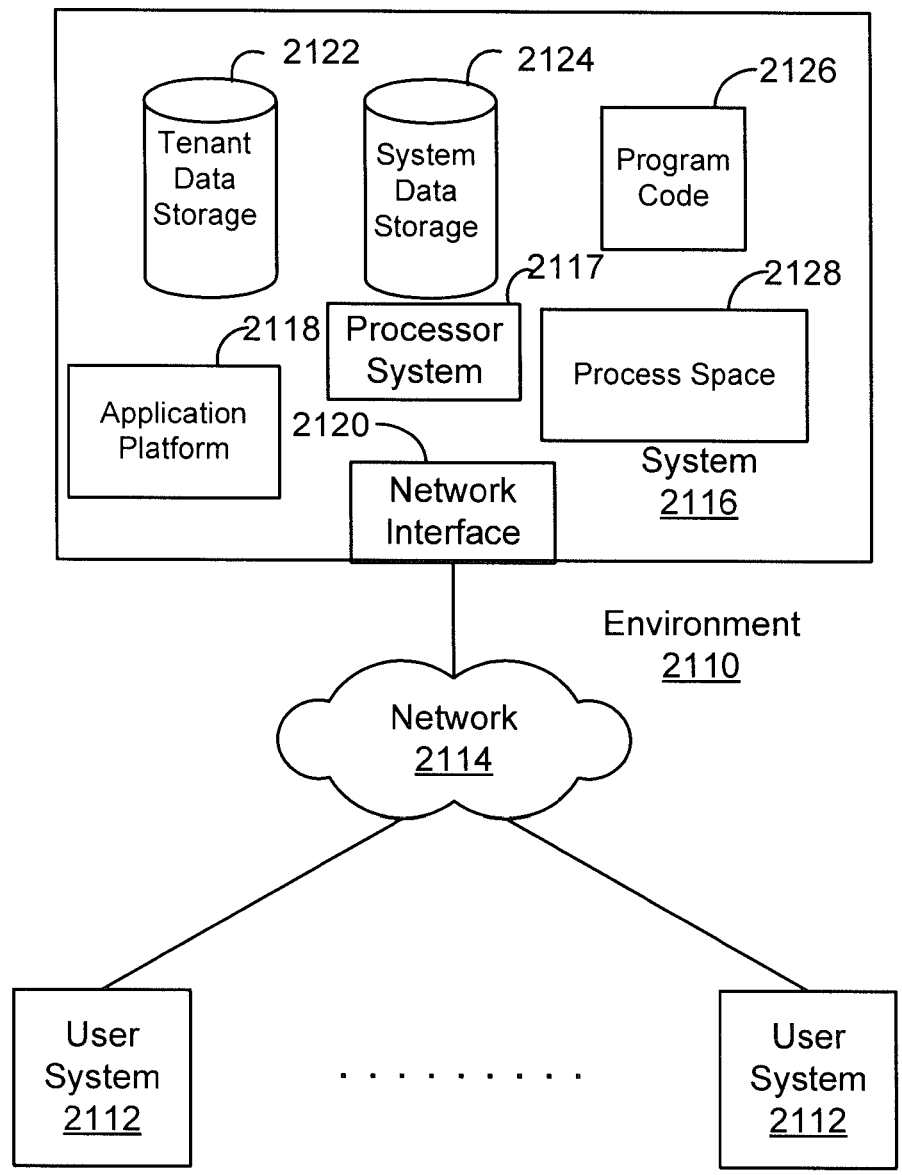
FIG. 21 illustrates a block diagram of an example of an environment wherein an on-demand database service implementing an embodiment of propagating a global filter to individual datasets might be used.

FIG. 21 illustrates a block diagram of an environment 2110 wherein an on-demand database service implementing an embodiment of a system and method for propagating a global filter to individual datasets might be used. Environment 2110 may include user systems 2112, network 2114, system 2116, processor system 2117, application platform 2118, network interface 2120, tenant data storage 2122, system data storage 2124, program code 2126, and process space 2128. In other embodiments, environment 2110 may not have all of the components listed and/or may have other elements instead of, or in addition to, those listed above.

Environment 2110 is an environment in which an on-demand database service exists. User system 2112 may be any machine or system that is used by a user to access a database user system. For example, any of user systems 2112 can be a handheld computing device, a mobile phone, a laptop computer, a work station, and/or a network of computing devices. As illustrated in FIG. 21 (and in more detail in FIG. 22) user systems 2112 might interact via a network 2114 with an on-demand database service, which is system 2116.

An on-demand database service, such as system 2116, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 2116" and "system 2116" will be used interchangeably herein. A database image may include one or more database objects. A relational database management system (RDMS) or the equivalent may execute storage and retrieval of information against the database object(s). Application platform 2118 may be a framework that allows the applications of system 2116 to run, such as the hardware and/or software, e.g., the operating system. In an embodiment, on-demand database service 2116 may include an application platform 2118 that enables creation, managing and executing one or more applications developed by the provider of the on-demand database service, users accessing the on-demand database service via user systems 2112, or third party application developers accessing the on-demand database service via user systems 2112.

The users of user systems 2112 may differ in their respective capacities, and the capacity of a particular user system 2112 might be entirely determined by permissions (permission levels) for the current user. For example, where a salesperson is using a particular user system 2112 to interact with system 2116, that user system has the capacities allotted to that salesperson. However, while an administrator is using that user system to interact with system 2116, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 2114 is any network or combination of networks of devices that communicate with one another. For example, network 2114 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the one or more implementations might use are not so limited, although TCP/IP is a frequently implemented protocol.

User systems 2112 might communicate with system 2116 using TCP/IP and, at a higher network level, use other common Internet protocols to communicate, such as HTTP, FTP, AFS, WAP, etc. In an example where HTTP is used, user system 2112 might include an HTTP client commonly referred to as a "browser" for sending and receiving HTTP messages to and from an HTTP server at system 2116. Such an HTTP server might be implemented as the sole network interface between system 2116 and network 2114, but other techniques might be used as well or instead. In some implementations, the interface between system 2116 and network 2114 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 2116, shown in FIG. 21, implements a web-based customer relationship management (CRM) system. For example, in one embodiment, system 2116 includes application servers configured to implement and execute CRM software applications as well as provide related data, code, forms, webpages and other information to and from user systems 2112 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 2116 implements applications other than, or in addition to, a CRM application. For example, system 2116 may provide tenant access to multiple hosted (standard and custom) applications, including a CRM application. User (or third party developer) applications, which may or may not include CRM, may be supported by the application platform 2118, which manages creation, storage of the applications into one or more database objects and executing of the applications in a virtual machine in the process space of the system 2116.

One arrangement for elements of system 2116 is shown in FIG. 21, including a network interface 2120, application platform 2118, tenant data storage 2122 for tenant data 2123, system data storage 2124 for system data 2125 accessible to system 2116 and possibly multiple tenants, program code 2126 for implementing various functions of system 2116, and a process space 2128 for executing MTS system processes and tenant-specific processes, such as running applications as part of an application hosting service. Additional processes that may execute on system 2116 include database indexing processes.

Several elements in the system shown in FIG. 21 include conventional, well-known elements that are explained only briefly here. For example, each user system 2112 could include a desktop personal computer, workstation, laptop, PDA, cell phone, or any wireless access protocol (WAP) enabled device or any other computing device capable of interfacing directly or indirectly to the Internet or other network connection. User system 2112 typically runs an HTTP client, e.g., a browsing program, such as Microsoft's Internet Explorer browser, Google's Chrome browser, Mozilla's Firefox browser, Apple's Safari browser, Netscape's Navigator browser, Opera's browser, or a WAP-enabled browser in the case of a cell phone, smartphone, PDA or other wireless device, or the like, allowing a user (e.g., subscriber of the multi-tenant database system) of user system 2112 to access, process and view information, pages and applications available to it from system 2116 over network 2114. Each user system 2112 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 2116 or other systems or servers. For example, the user interface device can be used to access data and applications hosted by system 2116, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 2112 and all of its components are operator configurable using applications, such as a browser, including computer code run using a central processing unit such as an Intel Pentium® processor or the like. Similarly, system 2116 (and additional instances of an MTS, where more than one is present) and all of their components might be operator configurable using application(s) including computer code to run using a central processing unit such as processor system 2117, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 2116 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Oracle America, Inc.).

According to one embodiment, each system 2116 is configured to provide webpages, forms, applications, data and media content to user (client) systems 2112 to support the access by user systems 2112 as tenants of system 2116. As such, system 2116 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 22:
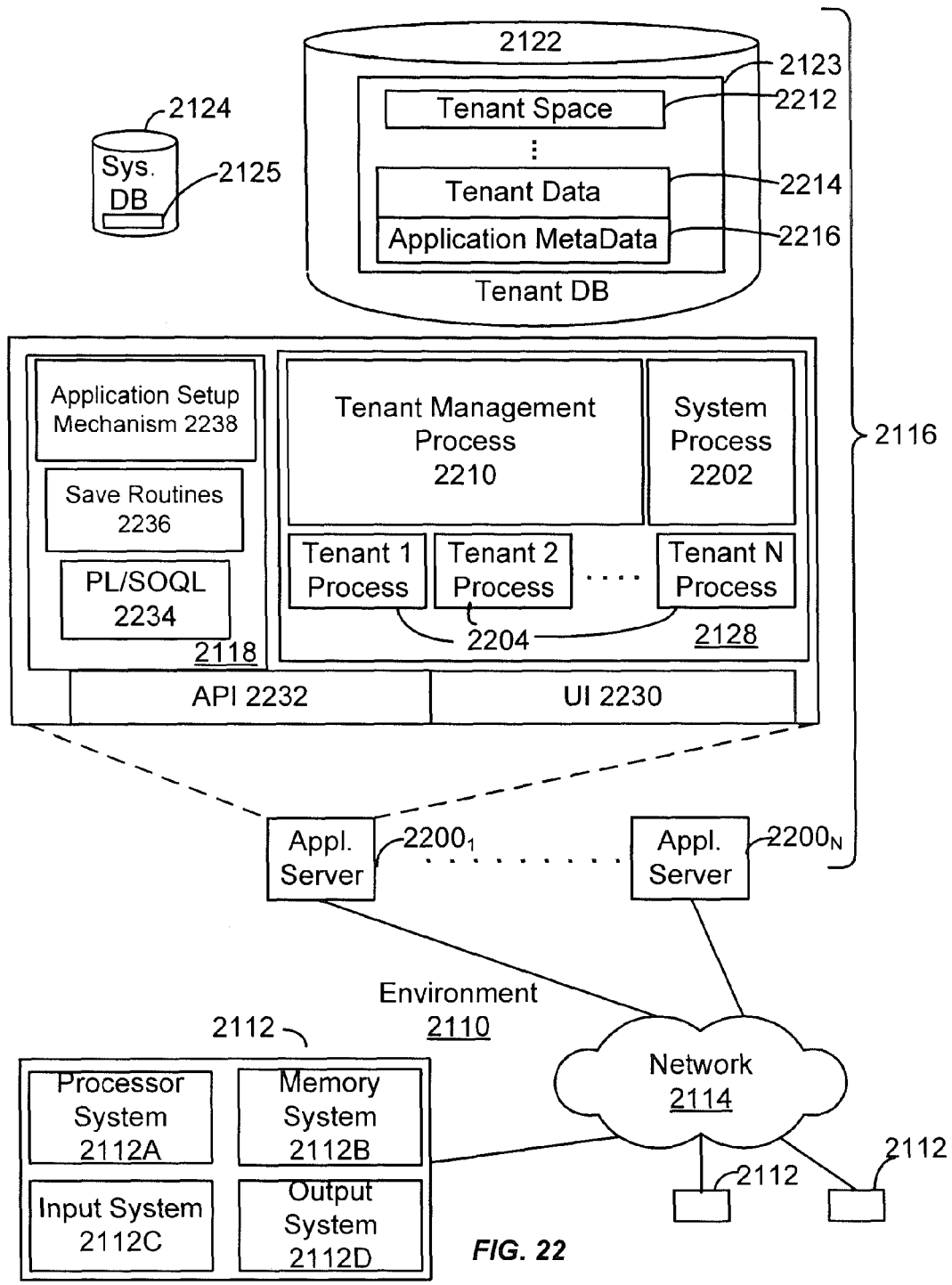
FIG. 22 illustrates a block diagram of an embodiment of elements of FIG. 21 and various possible interconnections between these elements.

FIG. 22 also illustrates environment 2110. However, in FIG. 22 elements of system 2116 and various interconnections in an embodiment are further illustrated. FIG. 22 shows that user system 2112 may include processor system 2112A, memory system 2112B, input system 2112C, and output system 2112D. FIG. 22 shows network 2114 and system 2116. FIG. 22 also shows that system 2116 may include tenant data storage 2122, tenant data 2123, system data storage 2124, system data 2125, User Interface (UI) 2230, Application Program Interface (API) 2232, PL/SOQL 2234, save routines 2236, application setup mechanism 2238, applications servers 2200₁-2200ₙ, system process space 2202, tenant process spaces 2204, tenant management process space 2210, tenant storage area 2212, user storage 2214, and application metadata 2216. In other embodiments, environment 2110 may not have the same elements as those listed above and/or may have other elements instead of, or in addition to, those listed above.

User system 2112, network 2114, system 2116, tenant data storage 2122, and system data storage 2124 were discussed above in FIG. 21. Regarding user system 2112, processor system 2112A may be any combination of one or more processors. Memory system 2112B may be any combination of one or more memory devices, short term, and/or long term memory. Input system 2112C may be any combination of input devices, such as one or more keyboards, mice, trackballs, scanners, cameras, and/or interfaces to networks. Output system 2112D may be any combination of output devices, such as one or more monitors, printers, and/or interfaces to networks. As shown by FIG. 22, system 2116 may include a network interface 2120 (of FIG. 21) implemented as a set of HTTP application servers 2200, an application platform 2118, tenant data storage 2122, and system data storage 2124. Also shown is system process space 2202, including individual tenant process spaces 2204 and a tenant management process space 2210. Each application server 2200 may be configured to tenant data storage 2122 and the tenant data 2123 therein, and system data storage 2124 and the system data 2125 therein to serve requests of user systems 2112. The tenant data 2123 might be divided into individual tenant storage areas 2212, which can be either a physical arrangement and/or a logical arrangement of data. Within each tenant storage area 2212, user storage 2214 and application metadata 2216 might be similarly allocated for each user. For example, a copy of a user's most recently used (MRU) items might be stored to user storage 2214. Similarly, a copy of MRU items for an entire organization that is a tenant might be stored to tenant storage area 2212. A UI 2230 provides a user interface and an API 2232 provides an application programmer interface to system 2116 resident processes to users and/or developers at user systems 2112. The tenant data and the system data may be stored in various databases, such as one or more Oracle™ databases.

Application platform 2118 includes an application setup mechanism 2238 that supports application developers' creation and management of applications, which may be saved as metadata into tenant data storage 2122 by save routines 2236 for execution by subscribers as one or more tenant process spaces 2204 managed by tenant management process 2210 for example. Invocations to such applications may be coded using PL/SOQL 34 that provides a programming language style interface extension to API 2232. A detailed description of some PL/SOQL language embodiments is discussed in commonly owned U.S. Pat. No. 7,730,478 entitled, METHOD AND SYSTEM FOR ALLOWING ACCESS TO DEVELOPED APPLICATIONS VIA A MULTI-TENANT ON-DEMAND DATABASE SERVICE, by Craig Weissman, filed Sep. 21, 2007, which is incorporated in its entirety herein for all purposes. Invocations to applications may be detected by one or more system processes, which manages retrieving application metadata 2216 for the subscriber making the invocation and executing the metadata as an application in a virtual machine.

Each application server 2200 may be communicably coupled to database systems, e.g., having access to system data 2125 and tenant data 2123, via a different network connection. For example, one application server $2200_1$ might be coupled via the network 2114 (e.g., the Internet), another application server $2200_{N-1}$ might be coupled via a direct network link, and another application server $2200_N$ might be coupled by yet a different network connection. Transfer Control Protocol and Internet Protocol (TCP/IP) are typical protocols for communicating between application servers 2200 and the database system. However, it will be apparent to one skilled in the art that other transport protocols may be used to optimize the system depending on the network interconnect used.

In certain embodiments, each application server 2200 is configured to handle requests for any user associated with any organization that is a tenant. Because it is desirable to be able to add and remove application servers from the server pool at any time for any reason, there is preferably no server affinity for a user and/or organization to a specific application server 2200. In one embodiment, therefore, an interface system implementing a load balancing function (e.g., an F5 Big-IP load balancer) is communicably coupled between the application servers 2200 and the user systems 2112 to distribute requests to the application servers 2200. In one embodiment, the load balancer uses a least connections algorithm to route user requests to the application servers 2200. Other examples of load balancing algorithms, such as round robin and observed response time, also can be used. For example, in certain embodiments, three consecutive requests from the same user could hit three different application servers 2200, and three requests from different users could hit the same application server 2200. In this manner, system 2116 is multi-tenant, wherein system 2116 handles storage of, and access to, different objects, data and applications across disparate users and organizations.

As an example of storage, one tenant might be a company that employs a sales force where each salesperson uses system 2116 to manage their sales process. Thus, a user might maintain contact data, leads data, customer follow-up data, performance data, goals and progress data, etc., all applicable to that user's personal sales process (e.g., in tenant data storage 2122). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 2116 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 2116 might also maintain system level data usable by multiple tenants or other data. Such system level data might include industry reports, news, postings, and the like that are sharable among tenants.

In certain embodiments, user systems 2112 (which may be client systems) communicate with application servers 2200 to request and update system-level and tenant-level data from system 2116 that may require sending one or more queries to tenant data storage 2122 and/or system data storage 2124. System 2116 (e.g., an application server 2200 in system 2116) automatically generates one or more SQL statements (e.g., one or more SQL queries) that are designed to access the desired information. System data storage 2124 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table."

In some multi-tenant database systems, tenants may be allowed to create and store custom objects, or they may be allowed to customize standard entities or objects, for example by creating custom fields for standard objects, including custom index fields. U.S. Pat. No. 7,779,039, filed Apr. 2, 2004, entitled "Custom Entities and Fields in a Multi-Tenant Database System", which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method comprising:
providing, by a computing system having a processor, a dashboard component that summarizes a set of records, each record having a plurality of fields;
receiving, by the computing system, a filter specifying a field, and a filter option;
applying, by the computing system, the filter to the dashboard component by examining the fields of the set of records to identify a field that matches the specified field;
selecting automatically by the computing system, based on a set of rules, a field, different from the specified field, as a default field to filter when the set of records does not include a field that matches the specified field, wherein selecting the default field comprises:
selecting one of the plurality of fields that is equivalent to the specified field as the default field when the selected field maps to a same data object as the specified field, and
selecting one of two or more fields as the default field based on the selected field being included in a report when the plurality of fields includes two or more fields that are equivalent to the specified field;
comparing, by the computing system, values from the default field using the specified filter option; and
generating, by the computing system, based on the comparison, a subset of records from the set of records for the dashboard component to summarize.

2. The method of claim 1 wherein the selecting, based on a set of rules, a default field comprises:
traversing a dataset structure associated with the dashboard component, the dataset structure comprising a plurality of objects arranged in a hierarchical order; and
examining an object according to the hierarchical order to find a field that is equivalent to the specified field, wherein an object that is higher in the hierarchical order is examined before an object that is lower in the hierarchical order.

3. A non-transitory machine-readable medium carrying one or more sequences of instructions, which instructions, when executed by one or more processors, cause the one or more processors to carry out the steps of:
provide a dashboard component that summarizes a set of records, each record having a plurality of fields;
receive a filter specifying a field, and a filter option;
apply the filter to the dashboard component by examining the fields of the set of records to identify a field that matches the specified field;
select, automatically based on a set of rules, a field, different from the specified field, as a default field to filter when the set of records does not include a field that matches the specified field, wherein selecting the default field comprises:
selecting one of the plurality of fields that is equivalent to the specified field as the default field when the selected field maps to a same data object as the specified field, and
selecting one of two or more fields as the default field based on the selected field being included in a report when the plurality of fields includes two or more fields that are equivalent to the specified field;
compare values from the default field using the specified filter option; and
generate, based on the comparison, a subset of records from the set of records for the dashboard component to summarize.

4. The machine-readable medium of claim 3 wherein the selecting, based on a set of rules, a default field comprises:
traversing a dataset structure associated with the dashboard component, the dataset structure comprising a plurality of objects arranged in a hierarchical order; and
examining an object according to the hierarchical order to find a field that is equivalent to the specified field, wherein an object that is higher in the hierarchical order is examined before an object that is lower in the hierarchical order.

5. An apparatus comprising:
a processor; and
one or more stored sequences of instructions which, when executed by the processor, cause the processor to:
provide a dashboard component that summarizes a set of records, each record having a plurality of fields;
receive a filter specifying a field, and a filter option;
apply the filter to the dashboard component by examining the fields of the set of records to identify a field that matches the specified field;
select, automatically based on a set of rules, a field, different from the specified field, as a default field to filter when the set of records does not include a field that matches the specified field, wherein selecting the default field comprises:
selecting one of the plurality of fields that is equivalent to the specified field as the default field when the selected field maps to a same data object as the specified field, and
selecting one of two or more fields as the default field based on the selected field being included in a report when the plurality of fields includes two or more fields that are equivalent to the specified field;
compare values from the default field using the specified filter option; and
generate, based on the comparison, a subset of records from the set of records for the dashboard component to summarize.

6. The apparatus of claim 5 wherein the selecting, based on a set of rules, a default field comprises:
traversing a dataset structure associated with the dashboard component, the dataset structure comprising a plurality of objects arranged in a hierarchical order; and
examining an object according to the hierarchical order to find a field that is equivalent to the specified field, wherein an object that is higher in the hierarchical order is examined before an object that is lower in the hierarchical order.

7. A system comprising:
a processor-based application, which when executed on a computer, will cause the processor to:

provide a dashboard component that summarizes a set of records, each record having a plurality of fields;

receive a filter specifying a field, and a filter option;

apply the filter to the dashboard component by examining the fields of the set of records to identify a field that matches the specified field;

to select, automatically based on a set of rules, a field, different from the specified field, as a default field to filter when the set of records does not include a field that matches the specified field, wherein selecting the default field comprises:

selecting one of the plurality of fields that is equivalent to the specified field as the default field when the selected field maps to a same data object as the specified field, and selecting one of two or more fields as the default field based on the selected field being included in a report when the plurality of fields includes two or more fields that are equivalent to the specified field;

compare values from the default field using the specified filter option; and generate, based on the comparison, a subset of records from the set of records for the dashboard component to summarize.

8. The system of claim 7 wherein the application, when executed on a computer, will further cause the processor to:

traverse a dataset structure associated with the dashboard component, the dataset structure comprising a plurality of objects arranged in a hierarchical order; and examine an object according to the hierarchical order to find a field that is equivalent to the specified field, wherein an object that is higher in the hierarchical order is examined before an object that is lower in the hierarchical order.

* * * * *